(12) United States Patent
Saad et al.

(10) Patent No.: US 12,462,166 B2
(45) Date of Patent: Nov. 4, 2025

(54) MACHINE LEARNING APPROACHES FOR INTERFACE FEATURE ROLLOUT ACROSS TIME ZONES OR GEOGRAPHIC REGIONS

(71) Applicant: Adobe Inc., San Jose, CA (US)

(72) Inventors: Michele Saad, Austin, TX (US); Lauren Dest, Austin, TX (US)

(73) Assignee: Adobe Inc., San Jose, CA (US)

( * ) Notice: Subject to any disclaimer, the term of this patent is extended or adjusted under 35 U.S.C. 154(b) by 978 days.

(21) Appl. No.: 17/500,785

(22) Filed: Oct. 13, 2021

(65) Prior Publication Data
US 2023/0115855 A1 Apr. 13, 2023

(51) Int. Cl.
*G06N 5/022* (2023.01)
*G06N 5/04* (2023.01)
*G06F 3/04847* (2022.01)

(52) U.S. Cl.
CPC ............ *G06N 5/022* (2013.01); *G06N 5/04* (2013.01); *G06F 3/04847* (2013.01)

(58) Field of Classification Search
CPC . G06N 5/022; G06N 5/04; G06N 3/04; G06F 3/04847; G06F 3/0482; G06Q 30/0201; G06Q 30/0242; G06Q 30/0251; G06Q 30/0282; G06Q 30/0631; G06Q 30/0641
See application file for complete search history.

(56) References Cited

U.S. PATENT DOCUMENTS

| | | | | |
|---|---|---|---|---|
| 10,725,625 | B2 * | 7/2020 | Chen | G06F 16/955 |
| 2008/0122691 | A1 * | 5/2008 | Carani | H04L 67/60 |
| | | | | 342/357.48 |
| 2008/0163320 | A1 * | 7/2008 | Chen | H04N 21/25841 |
| | | | | 725/112 |
| 2018/0190011 | A1 * | 7/2018 | Platt | G02B 27/017 |
| 2020/0111134 | A1 * | 4/2020 | Zheng | G06Q 30/0276 |
| 2020/0282980 | A1 * | 9/2020 | Kinoshita | G05D 1/0027 |

FOREIGN PATENT DOCUMENTS

JP 2003513553 A * 4/2003 ....... H04N 21/44224

* cited by examiner

*Primary Examiner* — Alexandru Cirnu
(74) *Attorney, Agent, or Firm* — Keller Preece PLLC

(57) ABSTRACT

The present disclosure relates to systems, methods, and non-transitory computer readable media for flexibly and accurately utilizing a machine learning model to intelligently determine and provide interface features for display via client devices located across different time zones or geographic regions. For example, the disclosed systems can utilize a feature visualization machine learning model to generate an arrangement of graphics, an assortment of graphics, or other graphical visualization of one or more interface features in a target time zone (or a target geographic region) based on client device interactions from other (e.g., leading) time zones or geographic regions. In certain embodiments, the disclosed systems also (or alternatively) determine a sequence of geographic regions for rolling out, or surfacing, an interface feature based on similarities between geographic regions and a comparison of performance metrics over multiple candidate sequences.

20 Claims, 12 Drawing Sheets

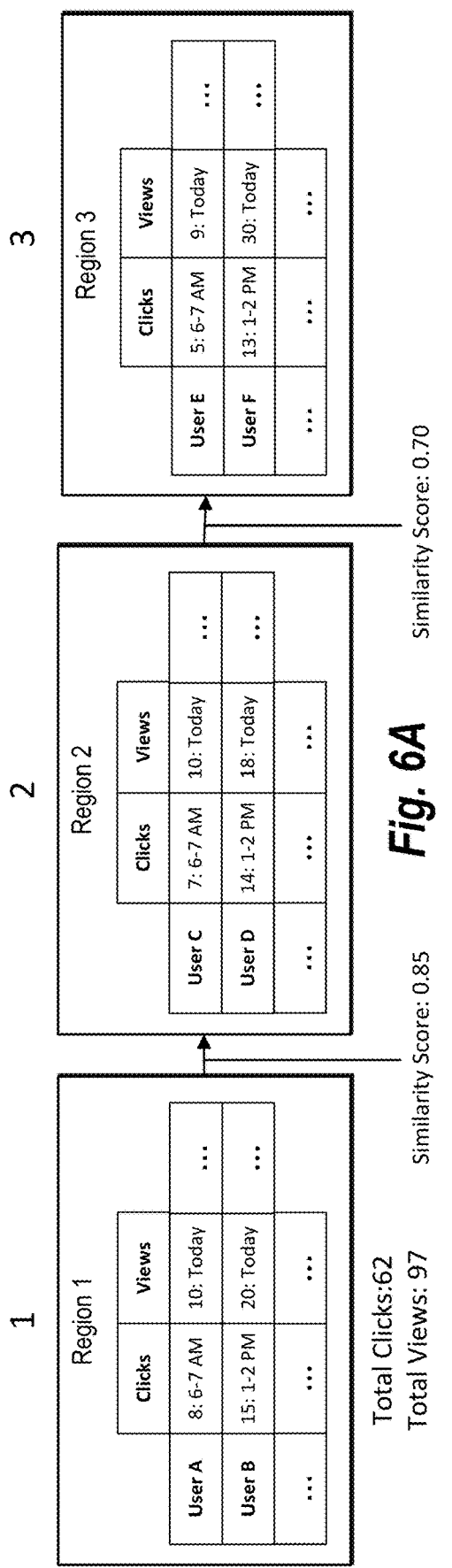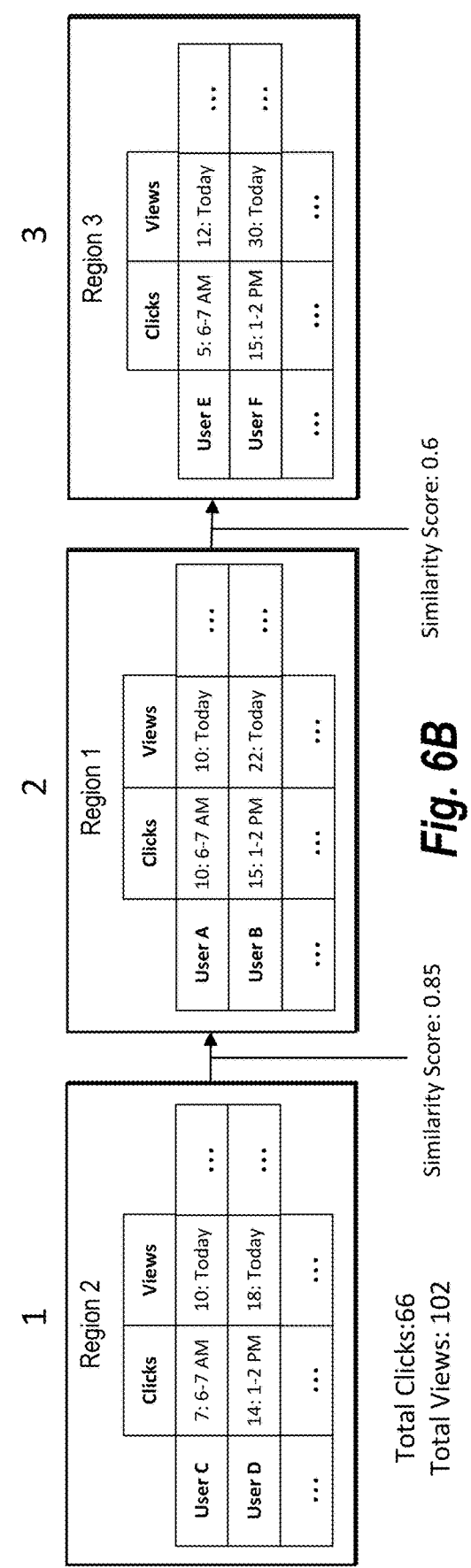

MACHINE LEARNING APPROACHES FOR INTERFACE FEATURE ROLLOUT ACROSS TIME ZONES OR GEOGRAPHIC REGIONS

BACKGROUND

Recent developments in hardware and software platforms have led to innovations in systems and methods for distributing digital content to client devices. For example, engineers have developed some conventional digital content distribution systems that utilize analytical approaches to distribute digital content at particular times and to particular devices based on historical distribution patterns and results. Despite these advances, however, many conventional digital content distribution systems continue to demonstrate a number of deficiencies or drawbacks, particularly in flexibility and efficiency.

For example, many conventional digital content distribution systems inflexibly provide or surface graphical user interface features for display on client devices. To elaborate, conventional systems often rigidly distribute digital content in a uniform fashion, surfacing interface features in the same way regardless of the time or location) of respective client devices receiving the digital content. For instance, conventional systems frequently provide a product website that displays the same arrangement and assortment of interface features, such as digital images, banners, and product descriptions regardless of which computing devices access the product website.

Due at least in part to their inflexibility, some existing digital content distribution systems also inefficiently present rigid or navigation-intensive graphical user interfaces. More specifically, conventional systems often require excessive numbers of client device interactions to locate certain interface features, which consequently consumes excessive computing resources, such as processing power and memory, that could otherwise be avoided. For instance, certain conventional systems maintain a nested location for a popular product within several interface layers of an application or website, requiring many client device interactions to navigate to, and access, the product from each client device that utilizes the application or website. Due to their inflexible nature, existing systems often provide particularly popular interface features at locations nested within multiple layers of graphical user interfaces, requiring several client device interactions to locate and select.

Thus, there are disadvantages regarding conventional digital content distribution systems.

SUMMARY

This disclosure describes one or more embodiments of systems, methods, and non-transitory computer readable media that solve one or more of the foregoing or other problems in the art. For example, the disclosed systems utilize a machine learning model to intelligently determine and provide interface features for display via client devices located across different time zones or geographic regions. When using such a machine learning model, the disclosed systems can modify locations for (or different types of) graphical-user-interface features surfaced via client devices in one time zone (or geographic region) based on client device interactions with the interface features from other time zones (or geographic regions).

To illustrate, in some cases, the disclosed systems utilize a feature visualization machine learning model to generate an arrangement of graphics, an assortment of graphics, or other graphical visualization of one or more interface features in a target time zone (or a target geographic region) based on client device interactions from other (e.g., leading) time zones or geographic regions. In certain embodiments, the disclosed systems also (or alternatively) determine a sequence of geographic regions for rolling out, or surfacing, an interface feature based on similarities between geographic regions and a comparison of performance metrics over multiple candidate sequences. By utilizing a feature visualization machine learning model to generate a graphical visualization for surfacing an interface feature, the disclosed systems intelligently provides interface features in modified arrangements and/or assortments in a flexible, efficient manner.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIGS. 6A-6B illustrate candidate orders of geographic regions for rolling out interface features in accordance with one or more embodiments;

DETAILED DESCRIPTION

Figure 1:
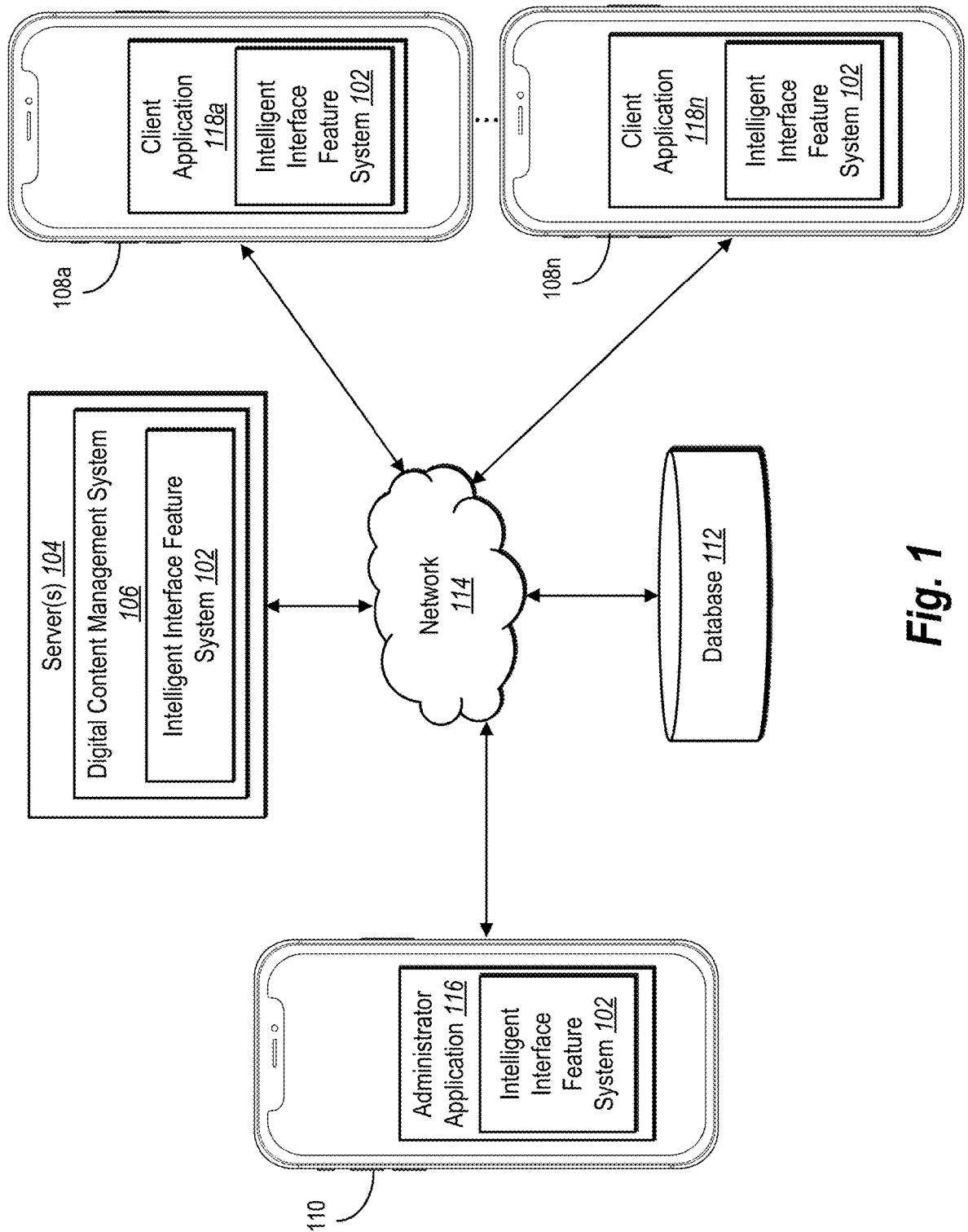
FIG. 1 illustrates an example system environment in which an intelligent interface feature system operates in accordance with one or more embodiments.

This disclosure describes one or more embodiments of an intelligent interface feature system that utilizes machine learning approaches to flexibly and efficiently provide interface features for display on client devices located within different time zones or geographic regions. In particular, in some embodiments, the intelligent interface feature system utilizes a feature visualization machine learning model to generate an arrangement of graphics, an assortment of graphics, or other graphical visualizations of interface features to reduce client device interactions and to improve performance metrics compared to conventional digital content distribution systems.

In particular, in certain cases, the intelligent interface feature system determines client device interactions associated with interface features displayed within one or more graphical user interfaces of client devices in a sample time zone (or sample geographic region). Based on the client device interactions in the sample time zone (or sample geographic region), in one or more embodiments, the intelligent interface feature system utilizes a feature visualization machine learning model to generate an updated graphical visualization for a target time zone or a target geographic region (e.g., to surface an interface feature earlier, to surface an interface feature in another location, and/or to increase overall client device interactions). Additionally, in some cases, the intelligent interface feature system compares multiple candidate orders or candidate sequences of geographic regions to select an order or sequence of geographic sequences for rollout out an interface feature to achieve a certain performance metric.

As just mentioned, in one or more embodiments, the intelligent interface feature system generates graphical visualizations of interface features utilizing a feature visualization machine learning model. For example, the intelligent interface feature system generates a graphical visualization of a set of interface features, where the graphical visualization includes or spans one or more graphical user interfaces navigable via client device interaction. In some cases, the intelligent interface feature system generates the graphical visualization to depict or visualize the set of interface features in a particular arrangement and/or assortment within graphical user interfaces displayed on client devices located within (or otherwise associated with) a sample time zone (or a sample geographic region). For instance, the intelligent interface feature system generates the graphical visualization for display via client devices located within a leading time zone that precedes a target time zone.

As further mentioned, in one or more embodiments, the intelligent interface feature system updates or modifies the graphical visualization for a target time zone or a target geographic region. For instance, in some cases, the intelligent interface feature system updates a graphical visualization for a target time zone, as informed by client device interactions from a sample (e.g., leading) time zone that precedes the target time zone. For example, the intelligent interface feature system generates an updated graphical visualization for display on client devices located within the target time zone or the target geographic region based on client device interactions from the sample time zone (or the same geographic region).

In some embodiments, the intelligent interface feature system determines client device interactions in relation to the set of interface features included within the graphical visualization provided to the sample time zone (or sample geographic region). In these or other embodiments, the intelligent interface feature system further generates the updated graphical visualization for the target time zone (or the target geographic region) with a modified arrangement and/or assortment of interface features based on the client device interactions. For instance, the intelligent interface feature system generates the updated graphical visualization to relocate, remove, and/or rearrange interface features based on the client device interactions (e.g., to surface highly selected interface features sooner or more prominently and/or to increase performance metrics such as clicks or conversions).

As also mentioned, in one or more embodiments, the intelligent interface feature system determines an order or sequence of geographic regions for rolling out an interface feature. For example, the intelligent interface feature system selects an initial geographic region and generates an order of geographic regions similar to the initial geographic region (e.g., similarity chain) based on similarity scores between regions. In some cases, the intelligent interface feature system determines similarity scores between geographic regions based on historical network user behavior.

In certain embodiments, the intelligent interface feature system generates the particular similarity chain or other order of geographic regions for rolling out an interface by testing candidate orders of geographic regions. Particularly, in some embodiments, the intelligent interface feature system provides an interface feature for display on client devices in successive geographic regions according to the multiple candidate orders to determine which candidate order performs well relative to other orders (e.g., which candidate order results in at least a threshold performance metric associated with the interface feature). In these or other embodiments, the intelligent interface feature system selects an order with at least a threshold performance and provides the interface feature for display successively or sequentially in geographic regions according to the selected order.

As suggested above, in certain embodiments, the intelligent interface feature system provides certain improvements or advantages over conventional digital content distribution systems. For example, in some embodiments, the intelligent interface feature system improves flexibility over conventional systems by dynamically adapting graphical visualizations to a target time zone or a target geographic region. To elaborate, compared to conventional systems that are rigidly fixed to distributing digital content uniformly across time zones or other geographic regions, the intelligent interface feature system utilizes a feature visualization machine learning model to flexibly adapt graphical visualizations for time zones or other geographic regions. For instance, intelligent interface feature system generates graphical visualizations of interface features intelligently tailored specifically to time zones or geographic regions based on client device interactions in relation to the interface features within preceding time zones or other geographic regions.

Due at least in part to the improved flexibility of the intelligent interface feature system, some embodiments of the intelligent interface feature system also improve efficiency over existing digital content distribution systems. In particular, in some embodiments, the intelligent interface feature system intelligently rearranges, sorts, or otherwise modifies interface features based on client device interactions. Consequently, the intelligent interface feature system reduces the number of client device interactions required to access desired data and/or functionality as compared to prior systems. For example, the intelligent interface feature system generates updated or modified graphical visualizations with improved assortments and/or arrangements of interface features. In some cases, the intelligent interface feature system generates graphical visualizations that surface more popular (e.g., highly selected) interface features in new locations and/or at earlier views within a series of graphical user interfaces.

While a conventional system would often require the same number of client device interactions to navigate through multiple graphical user interfaces to access a highly selected interface feature in every time zone or geographic region, the intelligent interface feature system adapts to reduce client device interactions by surfacing the highly selected interface feature earlier within the updated graphical visualization. Consequently, the intelligent interface feature system reduces computing requirements of processing client device interactions, thereby conserving processing power and memory, compared to conventional systems.

Contributing at least in part to the improved flexibility and efficiency of the intelligent interface feature system, in some embodiments, the intelligent interface feature system utilizes a novel machine learning model not found in prior systems—the feature visualization machine learning model. Indeed, the intelligent interface feature system trains and utilizes the feature visualization machine learning model to generate updated graphical visualizations to improve performance metrics and/or reduce client device interactions by presenting interface features within modified assortments and/or arrangements.

As suggested by the foregoing discussion, this disclosure utilizes a variety of terms to describe features and benefits of the intelligent interface feature system. Additional detail is hereafter provided regarding the meaning of these terms as used in this disclosure. In particular, the term the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of decision trees, support vector machines, Bayesian networks, linear regressions, logistic regressions, random forest models, or neural networks.

As an example of a specific machine learning model, the intelligent interface feature system utilizes a feature visualization machine learning model. As used herein, the term "feature visualization machine learning model" refers to a machine learning model that generates predictions of interface features and/or corresponding locations for placing interface features within one or more graphical user interfaces (e.g., a sequence or set of graphical user interfaces). In some cases, for instance, a feature visualization machine learning model generates a predicted arrangement, assortment, design, or organization of one or more interface features or corresponding locations. Such predictions can come in the form of numerical indicators (e.g., numbers within a matrix) of interface features and/or locations, a series of labels representing interface features and/or locations, a binary classification or series of classifications (e.g., a matrix of "yes" or "no" terms indicating user selections), a graphical representation of interface features and/or locations, or other suitable output. For example, a feature visualization machine learning model generates predictions of (or locations for) graphical visualizations for interface features based on client device interactions (e.g., to reduce client device interactions to located popular interface features) and/or a target performance metric to, for instance, increase clicks or increase conversions.

In some cases, a feature visualization machine learning model includes a feature visualization neural network. As used herein, the term "feature visualization neural network" refers to a neural network that is trained or tuned to generate or predict a graphical visualization from client device interactions. Relatedly, the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

In some embodiments, a feature visualization machine learning model includes a collaborative filter recommendation model. As used herein, the term "collaborative filter recommendation model" refers to a machine learning model that generates predictions for graphical visualizations for interface features based on attributing client device interactions of one time zone (or geographic region) to another. For example, a collaborative filter recommendation model determines predictions of interface features according to a determined order of time zones or geographic regions. In some cases, a collaborative filter recommendation model determines a probability that one time zone (or region) will have the same client device interactions (or similar within a threshold range) as another based on similarity scores between the time zones (or regions). Thus, based on determining that two time zones (or regions) will have similar client device interactions, a collaborative filter recommendation system can predict a graphical visualization to distribute to one time zone (or region) based on client device interactions in another time zone (or region).

As used herein, the term "interface feature" refers to a displayable digital content feature, object, or element within a graphical user interface. For example, an interface feature includes an element depicted within a graphical user interface, such as a title, a banner, a digital image, a block of digital text (e.g., a text description), an icon (selectable or not), a figure, a graphic, or some other displayable object of digital content. In some cases, an interface feature relates to a product or service. For instance, an interface feature can include an advertisement banner for a particular product displayed within a website. As another example, a website for a particular product can include a set of interface features related to the product, such as a product name, a product description, a digital image depicting the product, and one or more selectable elements to add the product to a digital shopping cart, scroll through other digital images, view related product, or display reviews for the product.

In some embodiments, the intelligent interface feature system provides or presents interface features within a graphical visualization. As used herein, the term "graphical visualization" refers to a graphical assortment, arrangement, design, or organization of one or more interface features within one or more graphical user interfaces. In some cases, a graphical visualization includes a graphical representation of images, menu or selectable options, products, tools, videos, or other interface features in a particular assortment, arrangement, design, or organization. For example, a graphical visualization can refer to a layout of interface elements at particular locations within the webpage. As another example, a graphical visualization can refer to an arrangement of multiple webpages or multiple graphical user interfaces that each include respective interface features and that are presented in response to client device interaction to navigate between or across the different webpages or graphical user interfaces. In such cases, a graphical visualization can include an interface feature that is highly selected via client device interaction nested within several layers of graphical user interfaces.

As just noted, a graphical visualization can include an arrangement and/or and assortment of interface features. As used herein, the term "arrangement" refers to a layout, a placement, or a formation of interface features. For example, an arrangement can include or indicate pixel coordinate locations of individual interface elements, including indications of which graphical user interfaces include which interface features and where they are located. Relatedly, the term "assortment" refers to a selection or a collection of interface features. For instance, an assortment can include names or identifications of interface features included within a graphical user interface and can also (or alternatively) include names or identifications of interface features excluded from (or not included within) the graphical user interface.

In one or more embodiments, the intelligent interface feature system determines similarity scores between time zones or geographic regions based on network user behavior. As used herein, the term "network user behavior" refers to client device interactions received from client devices in relation to interface features or other digital content. For example, network user behavior includes information indicating timing and locations for clicks, conversions, views, scrolls, and other behavioral data. In some cases, network user behavior indicates a time zone or a geographic region where an action, such as a click, conversion, or view, originates and further indicates a timing for when the action took place and/or an identity of the interface feature(s) clicked, viewed, or otherwise acted upon.

As mentioned above, in some embodiments, the intelligent interface feature system generates an updated graphical visualization to improve a performance metric in relation to a previous version of a graphical visualization. As used herein, the term "performance metric" refers to a measure or metric indicating client device interactions that are in response to a particular interface feature (or combination of interface features). For example, a performance metric includes a selection count, a click count, a conversion count, a view count, a scroll count, or some other count of client device interactions attributable to one or more interface features. In some cases, a performance metric indicates a total number of a type of client device interactions, while in other cases a performance metric indicates a frequency (e.g., a number per unit time) and/or a recency of client device interactions. In some embodiments, a performance metric is a combination (e.g., a weighted combination) of two or more client device interactions, such as a combination of clicks, view, and conversions attributed to an interface feature (or a combination of interface features).

Additional detail regarding the intelligent interface feature system will now be provided with reference to the figures. For example, FIG. 1 illustrates a schematic diagram of an example system environment for implementing an intelligent interface feature system 102 in accordance with one or more embodiments. An overview of the intelligent interface feature system 102 is described in relation to FIG. 1. Thereafter, a more detailed description of the components and processes of the intelligent interface feature system 102 is provided in relation to the subsequent figures.

As shown, the environment includes server(s) 104, client devices 108a-108n, an administrator device 110, a database 112, and a network 114. Each of the components of the environment communicate via the network 114, and the network 114 is any suitable network over which computing devices communicate. Example networks are discussed in more detail below in relation to FIG. 12.

As mentioned, the environment includes client devices 108a-108n. The client devices 108a-108n are one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a number of client devices 108a-108n, in some embodiments, the environment includes more or fewer client devices, each associated with a different user (e.g., a digital content viewer). In one or more embodiments, the client devices 108a-108n are located in different time zones or geographic regions, where a first set of client devices (e.g., client devices 108a-108g) are located within a first (e.g., sample) time zone or a first (e.g., sample) geographic region, and a second set of client devices (e.g., client devices 108h-108n) are located within a second (e.g., target) time zone or a second (e.g., target) geographic region. The client devices 108a-108n communicate with the server(s) 104 via the network 114. For example, the client devices 108a-108n provide information to server(s) 104 indicating client device interactions (e.g., clicks, views, and scrolls in relation to interface features) and receive information from the server(s) 104, such as graphical visualizations including interface features. Thus, in some cases, the intelligent interface feature system 102 on the server(s) 104 provides and receives information based on client device interaction via the client devices 108a-108n.

As shown in FIG. 1, the client devices 108a-108n include respective client applications 118a-118n. In particular, the client applications 118a-118n are web applications, native applications installed on the client devices 108a-108n (e.g., mobile applications, desktop applications, etc.), or cloud-based applications where all or part of the functionality is performed by the server(s) 104. Based on instructions from the client applications 118a-118n, the client devices 108a-108n present or display information to a user, including graphical visualizations depicting one or more interface features.

As illustrated in FIG. 1, the environment includes the server(s) 104. The server(s) 104 generates, tracks, stores, processes, receives, and transmits electronic data, such as graphical visualizations and client device interactions. For example, the server(s) 104 receives data from the client devices 108a-108n in the form of clicks, scrolls, views, or other client device interactions. In response, the server(s) 104 transmits data to the client devices 108a-108n to cause the client devices 108a-108n to display or present a graphical visualization including interface features arranged or assorted according to the client device interactions.

As mentioned, in some embodiments, the server(s) 104 communicates with the client devices 108a-108n to transmit and/or receive data via the network 114. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server. The server(s) 104 can further access and utilize the database 112 to store and retrieve information such as a feature visualization machine learning model, one or more graphical visualizations depicting interface features, and client device interactions in relation to displayed interface features.

As further illustrated in FIG. 1, the environment also includes an administrator device 110. In particular, the administrator device 110 can be one of a variety of computing devices, including a smartphone, a tablet, a smart television, a desktop computer, a laptop computer, a virtual reality device, an augmented reality device, or another computing device as described in relation to FIG. 12. In some cases, the administrator device 110 communicates with the server(s) 104 to receive and/or provide information, such as digital content distribution parameters or settings.

For example, the administrator device 110 includes an administrator application 116. In particular, the administrator application is a web application, a native application installed on the administrator device 110 (e.g., a mobile application, a desktop application, etc.), or a cloud-based application where all or part of the functionality is performed by the server(s) 104. Based on instructions from the administrator application 116, the administrator device 110 presents or displays information to a user, including a digital content distribution settings interface. Based on interaction with various interface elements within the digital content distribution settings interface, the administrator device 110 can provide instructions to the server(s) 104 to modify digital content distribution within graphical visualization provided to client devices located within different time zones or geographic regions.

As further shown in FIG. 1, the server(s) 104 also includes the intelligent interface feature system 102 as part of a digital content management system 106. For example, in one or more implementations, the digital content management system 106 can store, generate, modify, edit, enhance, provide, distribute, and/or share digital content, such as interface features within graphical visualizations. For example, the digital content management system 106 provides graphical visualizations for display on the client devices 108a-108n, via the client applications 118a-118n, for viewing and interacting with interface features within the graphical visualizations. In some implementations, the digital content management system 106 provides tools via the administrator application 116 for the administrator device 110 to define settings or parameters for distributing interface features to different time zones or geographic regions.

In one or more embodiments, the server(s) 104 includes all, or a portion of, the intelligent interface feature system 102. For example, the intelligent interface feature system 102 operates on the server(s) 104 to generate updated graphical visualizations for client devices in target time zones or target geographic regions. In some cases, the intelligent interface feature system 102 utilizes, locally on the server(s) 104 or from another network location (e.g., the database 112), a feature visualization machine learning model to generate updated graphical visualizations based on client device interactions from sample time zones or sample geographic regions.

In certain cases, the client devices 108a-108n include all or part of the intelligent interface feature system 102. For example, the client devices 108a-108n can generate, obtain (e.g., download), or utilize one or more aspects of the intelligent interface feature system 102, such as a feature visualization neural network from the server(s) 104. Indeed, in some implementations, as illustrated in FIG. 1, the intelligent interface feature system 102 is located in whole or in part of the client devices 108a-108n and/or the administrator device 110. For example, the intelligent interface feature system 102 includes a web hosting application that allows the client devices 108a-108n and/or the administrator device 110 to interact with the server(s) 104. To illustrate, in one or more implementations, the client devices 108a-108n and/or the administrator device 110 accesses a web page supported and/or hosted by the server(s) 104.

Although FIG. 1 illustrates a particular arrangement of the environment, in some embodiments, the environment has a different arrangement of components and/or may have a different number or set of components altogether. For instance, as mentioned, the intelligent interface feature system 102 is implemented by (e.g., located entirely or in part on) the client devices 108a-108n. In addition, in one or more embodiments, the client devices 108a-108n and/or the administrator device 110 communicate directly with the intelligent interface feature system 102, bypassing the network 114. Further, in some embodiments, the environment includes a feature visualization machine learning model stored in the database 112, maintained by the server(s) 104, the client devices 108a-108n, the administrator device 110, or a third-party device.

Figure 2:
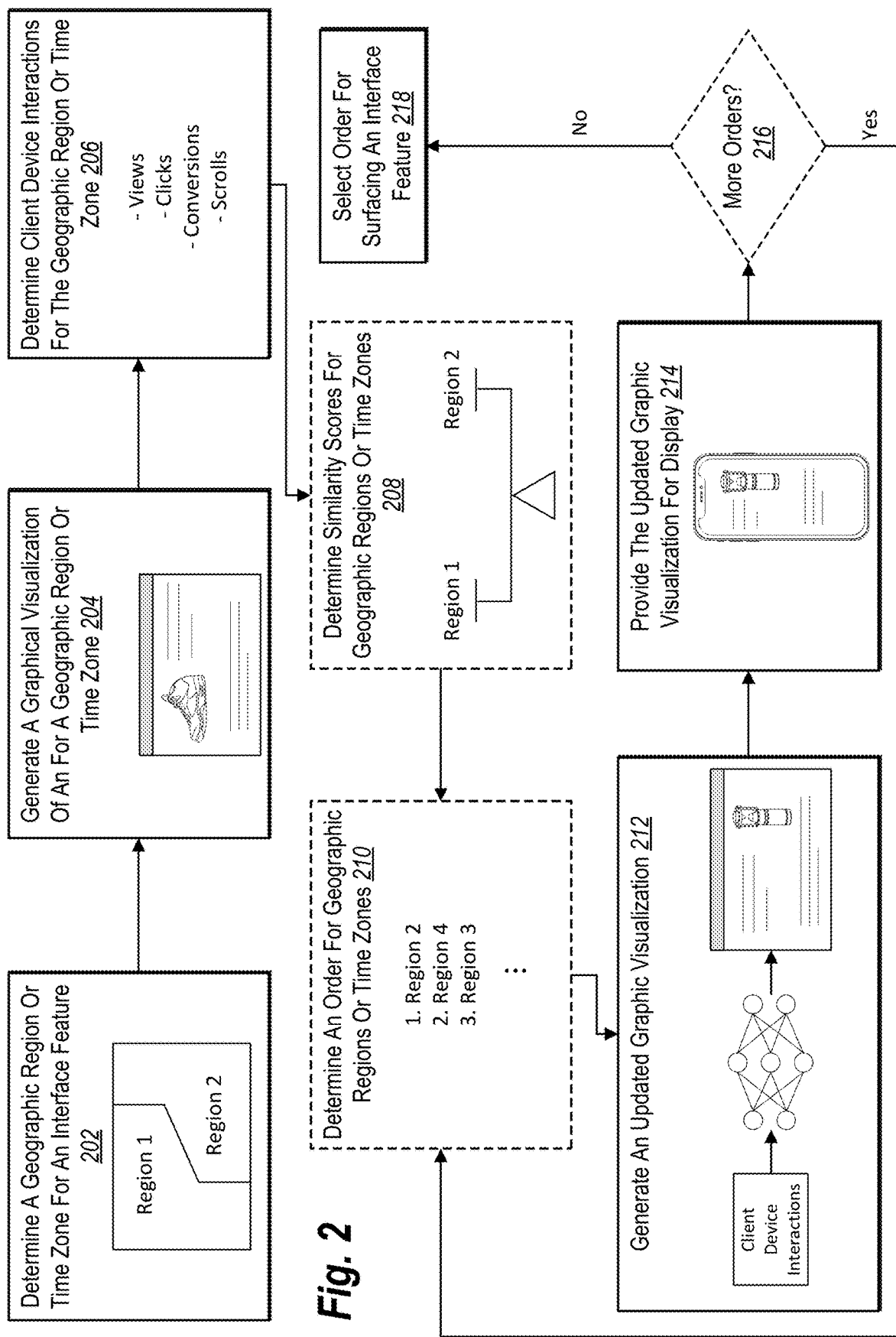
FIG. 2 illustrates an overview of the intelligent interface feature system generating an updated graphical visualization for a target time zone or target geographic region in accordance with one or more embodiments.

As mentioned, in one or more embodiments, the intelligent interface feature system 102 generates an updated graphical visualization including modified interface features for display on a client device located within a target time zone or a target geographic region. In particular, the intelligent interface feature system 102 generates an updated graphical visualization from client device interactions in a sample time zone or a sample geographic region utilizing a feature visualization machine learning model. FIG. 2 illustrates an example sequence of acts 202-218 for generating an updated graphical visualization in accordance with one or more embodiments. FIG. 2 provides an overview of generating an updated graphical visualization, and additional detail regarding the specific acts of FIG. 2 is provided in relation to subsequent figures.

As illustrated in FIG. 2, the intelligent interface feature system 102 performs an act 202 to determine a geographic region or a time zone for an interface feature. In particular, the intelligent interface feature system 102 determines or identifies a particular geographic region or time zone where an interface feature is surfaced for display on one or more client devices. For example, the intelligent interface feature system 102 determines a sample time zone or a sample geographic region. In some cases, the intelligent interface feature system 102 determines a sample time zone as a leading time zone preceding a target time zone. In one or more embodiments, the intelligent interface feature system 102 distinguishes or delineates geographic regions according to borders or boundaries of the geographic regions and/or based on content distribution regions. In some embodiments, the intelligent interface feature system 102 determines geographic regions of an arbitrary size, divided at any level of granularity and with any degree of variation between regions.

As further illustrated in FIG. 2, the intelligent interface feature system 102 performs an act 204 to generate a graphical visualization for a geographic region or time zone. In particular, the intelligent interface feature system 102 generates a graphical visualization that includes or depicts one or more interface features (e.g., a set of interface features). For example, the intelligent interface feature system 102 generates a graphical visualization that is a series of graphical user interfaces that each include interface features displayed based on navigation via client device interaction. In some cases, the intelligent interface feature system 102 generates the graphical visualization for display on client devices located within the sample time zone or the sample geographic region (as determined via the act 202).

Additionally, the intelligent interface feature system 102 performs an act 206 to determine client device interactions for the sample geographic region or the sample time zone. More specifically, the intelligent interface feature system 102 monitors or detects client device interactions such as view, clicks, scrolls, and conversions in relation to interface features displayed within the graphical visualization. In some embodiments, the intelligent interface feature system 102 determines client device interactions for each individual client device and for each time zone or geographic region. As mentioned above, the intelligent interface feature system 102 determines numbers, frequencies, and/or recencies of the different types of client device interactions (e.g., in relation to individual interface features). In some cases, the intelligent interface feature system 102 determines or detects that some interface features are selected, viewed, or otherwise interacted with more (or more frequently) than other interface features.

As further illustrated in FIG. 2, in some embodiments, the intelligent interface feature system 102 performs an act 208 to determine similarity scores for geographic regions or time zones. In particular, the intelligent interface feature system 102 determines similarity scores between two geographic regions (or between two time zones) based on historical network user behavior. For example, the intelligent interface feature system 102 determines historical network user behavior such as the client device interactions with the interface features determined via the act 206. In some cases, the intelligent interface feature system 102 determines additional or alternative network user behavior in relation to other digital content not part of a graphical visualization. For instance, based on specific device permissions and regulatory compliance, the intelligent interface feature system 102 monitors network traffic for different websites or applications to determine types of interface features that receive client device interactions within particular geographic regions or time zones.

Based on the client device interactions and/or other network user behavior, the intelligent interface feature system 102 generates similarity scores. Specifically, the intelligent interface feature system 102 generates a similarity score between two geographic regions that indicates a measure of similarity or likeness between the collective client device interactions and/or other network user behavior associated with (e.g., that occurred within) the respective geographic regions. In some cases, the intelligent interface feature system 102 generates similarity scores based on additional or alternative factors, such as similarities between demographics of geographic regions or time zones, such as age, gender, race, ethnicity, income, education, and language.

As shown in FIG. 2, in one or more embodiments, the intelligent interface feature system 102 performs an act 210 to determine an order for geographic regions or time zones. In particular, in some embodiments, the intelligent interface feature system 102 determines an order or a sequence of geographic regions for rolling out an interface feature based on similarity scores between the geographic regions. For example, the intelligent interface feature system 102 selects (or receives an indication of) an initial geographic region and determines an immediately subsequent geographic region with a highest similarity score in relation to the initial geographic region. In like fashion, the intelligent interface feature system 102 determines each successive geographic region within the order by linking a newly ordered geographic region to an immediately subsequent geographic region that has a highest similarity score, among remaining geographic regions, in relation to the newly ordered geographic region. Thus, based on selected a different initial geographic region, the intelligent interface feature system 102 generates an entirely new order of geographic regions based on similarity scores, linking regions together based on the highest available similarity scores.

As further illustrated in FIG. 2, the intelligent interface feature system 102 performs an act 212 to generate an updated graphical visualization. More specifically, the intelligent interface feature system 102 generates an updated arrangement and/or assortment of interface features utilizing a feature visualization machine learning model. In some cases, the intelligent interface feature system 102 generates an updated graphical visualization utilizing a feature visualization machine learning model. For instance, the intelligent interface feature system 102 utilizes a feature visualization machine learning model in the form of a collaborative filter recommendation model or a feature visualization neural network to generate an updated graphical visualization for a target time zone or a target geographic region.

Indeed, the intelligent interface feature system 102 generates the updated graphical visualization to modify the arrangement and/or assortment of interface features as compared to the graphical visualization initially provided to client devices within the sample time zone or sample geographic region. In some cases, the intelligent interface feature system 102 generates the updated graphical visualization to surface a popular interface feature (e.g., associated with at least a threshold number of client device interactions such as views, clicks, scrolls, and/or conversions) earlier than in the initial graphical visualization. In certain embodiments, the intelligent interface feature system 102 generates the updated graphical visualization to improve or increase a particular performance metric within the target time zone or target geographic region. For instance, the intelligent interface feature system 102 receives an indication (e.g., from the administrator device 110) of a target performance metric (e.g., to increase, views, clicks, and/or conversions). The intelligent interface feature system 102 further generates an updated graphical visualization to include interface features that are predicted to achieve the target performance metric.

As shown in FIG. 2, the intelligent interface feature system 102 performs an act 214 to provide the updated graphical visualization for display. In particular, the intelligent interface feature system 102 provides the updated graphical visualization for display on client devices located within a target time zone or a target geographic region. Indeed, the intelligent interface feature system 102 provides the updated graphical visualization to display or present interface features with a modified arrangement and/or a modified assortment, where interface features are located in different places (e.g., at different coordinate locations and/or within different graphical user interfaces) as compared to the initial graphical visualization.

As noted above, the intelligent interface feature system 102 sometimes targets time zones. Based on client device interactions from a sample (e.g., leading) time zone, the intelligent interface feature system 102 generates the updated graphical visualization and provides the updated graphical visualization for display on client devices in a target time zone. In some cases, the updated graphical visualization includes a popular interface feature earlier or in a location easier to locate (e.g., with fewer navigational client device interactions). Thus, for the target time zone, the intelligent interface feature system 102 reduces the number of client device interactions required to access certain interface features within the graphical visualization as compared to the initial graphical visualization.

As noted above, the intelligent interface feature system 102 sometimes targets geographic regions. In some embodiments, the intelligent interface feature system 102 provides the updated graphical visualization to an initial geographic region within a determined order of geographic regions (e.g., as determined via the act 210). For instance, the intelligent interface feature system 102 provides the updated graphical visualization for display on client devices located within the initial geographic region while excluding client devices in other geographic regions (e.g., by refraining from providing the updated graphical visualization or by providing an initial graphical visualization instead). The intelligent interface feature system 102 additionally provides the updated graphical visualization to each successive geographic region in the order in turn.

As further illustrated in FIG. 2, in one or more embodiments, the intelligent interface feature system 102 performs an act 216 to determine whether there are more orders of geographic regions. In particular, the intelligent interface feature system 102 determines whether each possible order of geographic regions has been tested for providing an updated graphical visualization. Upon determining that more orders remain, the intelligent interface feature system 102 returns to act 206 to determine client device interactions in relation to the updated graphical visualization. Indeed, the intelligent interface feature system 102 determines client device interactions that indicate one or more performance metrics associated with the graphical visualization provided to geographic regions within the first order. For instance, the intelligent interface feature system 102 determines clicks, views, scrolls, and/or conversions associated with particular interface features of the updated graphical visualization.

When repeating actions for a different order, in certain cases, the intelligent interface feature system 102 repeats the act 208 to determine new similarity scores between geographic regions. Indeed, based on the new client device interactions (from each of the geographic regions in the initial order) in relation to the updated graphical visualization, the intelligent interface feature system 102 determines new similarity scores, where regions that originally had a low similarity score may now have a high similarity score (or vice-versa). Further, the intelligent interface feature system 102 repeats the act 210 to determine a new order of geographic regions based on the updated similarity scores. For example, the intelligent interface feature system 102 selects (or receives a new indication of) a new initial geographic region and orders the remaining geographic regions in a similarity chain as before, with a most similar available geographic region linking to the last geographic region in the order.

In such a repeat cycle, in some embodiments, the intelligent interface feature system 102 repeats the acts 212 and 214 to, respectively, generate another updated graphical visualization and provide the newly updated graphical visualization for display. In particular, the intelligent interface feature system 102 generates a new updated graphical visualization based on the client device interactions of the previous updated graphical visualization. In some embodiments, however, the intelligent interface feature system 102 does not generate a new updated graphical visualization, instead skipping the act 212 and only performing the act 214 to provide the previous updated graphical visualization for display. Specifically, the intelligent interface feature system 102 provides the updated graphical visualization (e.g., the newly updated graphical visualization or the previous updated graphical visualization) for the new initial geographic region and for each successive geographic region in turn.

The intelligent interface feature system 102 further repeats the act 216 to determine whether there are additional orders of geographic regions remaining. Indeed, the intelligent interface feature system 102 determines whether all possible permutations of orders of geographic regions have been tested for client device interactions. In some embodiments, however, the intelligent interface feature system 102 determines whether a threshold number of orders have been tested rather than determining whether all possible candidate orders have been tested. Upon determining that more orders remain, the intelligent interface feature system 102 repeats the acts 206-216 as described above.

Upon determining that no orders remain (or that a threshold number of orders have been tested), however, the intelligent interface feature system 102 performs an act 218 to select an order for surfacing one or more interface features. In particular, the intelligent interface feature system 102 selects an order, based on performance metrics, from among the candidate orders generated via the act 210 and tested as described above. For example, the intelligent interface feature system 102 selects an order that results in a highest or best performance metric from among the candidate orders. In some cases, the intelligent interface feature system 102 selects an order that results (or is predicted to result) in a highest number (or frequency) of one or more target performance metrics.

Indeed, in one or more embodiments, the intelligent interface feature system 102 receives an indication (e.g., from the administrator device 110) of one or more target performance metrics. For instance, the intelligent interface feature system 102 receives an indication of a particular number (or frequency) of clicks, views, scrolls, conversions (or a combination of two or more thereof) as a target performance metric. As another example, rather than receiving an indication of a particular number, the intelligent interface feature system 102 receives an indication to increase or maximize one type of client device interaction (e.g., clicks, views, scroll, or conversions) or another. In some cases, the intelligent interface feature system 102 further compares the target performance metric with the performance metrics of the individual candidate orders to select an order that satisfies the target performance metric.

Figure 3:
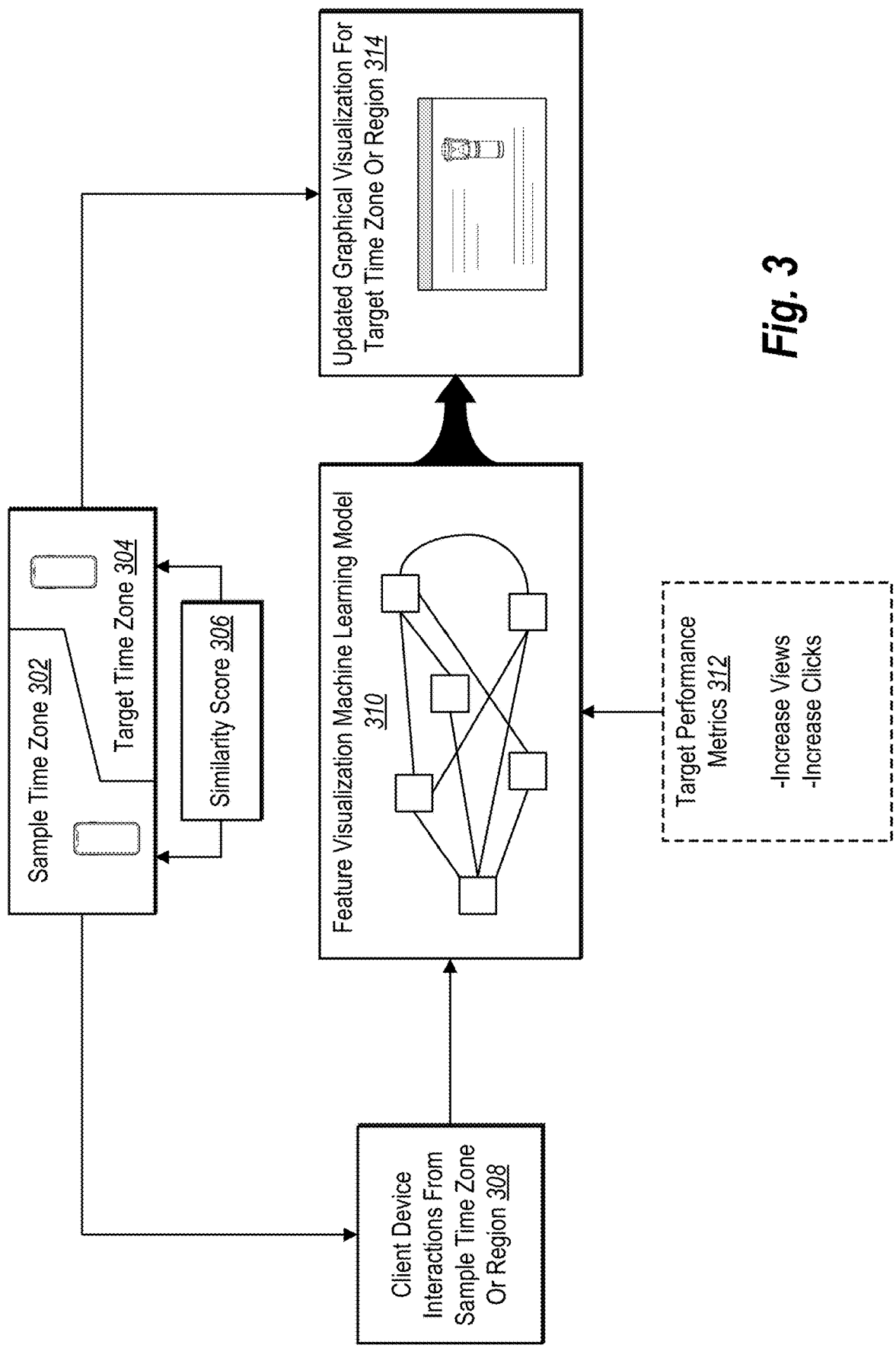
FIG. 3 illustrates an example of the intelligent interface feature system generating an updated graphical visualization utilizing a feature visualization machine learning model in accordance with one or more embodiments.

As mentioned above, in certain described embodiments, the intelligent interface feature system 102 generates an updated graphical visualization for a target time zone or a target geographic region (e.g., a geographic region subsequent to an initial geographic region within an order of geographic regions). In particular, the intelligent interface feature system 102 generates an updated graphical visualization based on client device interactions from a sample time zone or a sample geographic region. FIG. 3 illustrates generating an updated graphical visualization in accordance with one or more embodiments.

As illustrated in FIG. 3, the intelligent interface feature system 102 identifies a sample time zone 302 and a target time zone 304. In particular, the intelligent interface feature system 102 identifies the target time zone 304 based on receiving an indication of the target time zone from the administrator device 110. For example, the intelligent interface feature system 102 receives an indication of an administrator selection of a particular time zone to target as part of a digital content campaign to distribute digital content. In some cases, the intelligent interface feature system 102 receives an indication of a target geographic region (not necessarily defined by a time zone) in like fashion.

In addition, the intelligent interface feature system 102 identifies a sample time zone 302 as a time zone that has a threshold similarity in relation to the target time zone 304. In particular, the intelligent interface feature system 102 determines similarity scores between the target time zone 304 and a plurality of candidate time zones (e.g., one or more time zones that precede the target time zone 304). For example, the intelligent interface feature system 102 determines similarity scores based on historical network user behavior. Specifically, the intelligent interface feature system 102 monitors network user behavior in the target time zone 304 and other (e.g., preceding) time zones (including the sample time zone 302) over time to determine client device interactions such as clicks, views, scrolls, and conversions in relation to one or more interface features of a graphical visualization and/or in relation to other digital content distributed via the network 114 or some other network.

In response to detecting similar types, numbers, and/or frequencies of client device interactions from client devices within the different time zones (e.g., from client devices associated with user accounts that share attributes such as demographic information), the intelligent interface feature system 102 determines similarity scores. In addition, the intelligent interface feature system 102 compares the similarity scores with a threshold similarity score. While the foregoing discussion relates primarily to time zones, the intelligent interface feature system 102 can also determine similarity scores between geographic regions (e.g., between a target geographic region and a sample geographic region) in a similar fashion based on historical network user behavior indicating client device interactions over time.

As further shown in FIG. 3, the intelligent interface feature system 102 determines a similarity score 306 between the sample time zone 302 and the target time zone 304. In addition, the intelligent interface feature system 102 determines that the similarity score 306 satisfies a threshold similarity score. In some embodiments, however, the intelligent interface feature system 102 does not necessarily determine similarity scores as a basis for selecting a sample time zone (e.g., the sample time zone 302) in relation to a target time zone (e.g., the target time zone 304). Instead, the intelligent interface feature system 102 identifies a sample time zone as a time zone immediately preceding (e.g., with no other time zones in between) the target time zone 304.

As further illustrated in FIG. 3, the intelligent interface feature system 102 determines client device interactions 308 from the sample time zone 302 (or a sample geographic region). Indeed, as mentioned, the intelligent interface feature system 102 determines client device interactions 308 in relation to an initial graphical visualization provided for display via client devices located within the sample time zone 302 (or the sample geographic region). For example, the intelligent interface feature system 102 detects or determines clicks, views, scrolls, and/or conversions associated with one or more interface features of a graphical visualization.

Indeed, in some cases, the intelligent interface feature system 102 tracks client device interactions on an interface-feature basis to associate or ascribe client device interactions to individual interface features. For example, the intelligent interface feature system 102 detects a click of an interface feature as a client device interaction associated with the interface feature. In some cases, the intelligent interface feature system 102 compares client device interactions in relation to individual interface features to determine which interface features are interacted with more than others. In certain embodiments, the intelligent interface feature system 102 also (or alternatively) compares numbers (or frequencies) of client device interactions in relation to interface features with client device interaction thresholds to, for example, identify interface features associated with at least a threshold number (or frequency) of client device interactions.

As another example, the intelligent interface feature system 102 determines or splits portions or percentages of attribution of a client device interaction across multiple interface features. For instance, the intelligent interface feature system 102 determines that a click or a view or a conversion is motivated or caused by (or results from) a combination of two or more interface features, and the intelligent interface feature system 102 divides the attribution of the client device interaction accordingly. In some cases, the intelligent interface feature system 102 determines specific proportions of attribution for each interface feature based on comparing time spent viewing interface features, numbers of clicks on interface features, numbers of views of interface features, and/or numbers of scrolls through interface features.

As further illustrated in FIG. 3, the intelligent interface feature system 102 utilizes a feature visualization machine learning model 310 to generate an updated assortment and/or arrangement of interface features. For instance, the intelligent interface feature system 102 generates an updated graphical visualization 314 from the client device interactions 308. Indeed, the intelligent interface feature system 102 generates the updated graphical visualization 314 for the target time zone 304 (or a target geographic region). For instance, the intelligent interface feature system 102 generates the updated graphical visualization to include one or more interface features in a different arrangement and/or assortment than the interface features initially provided to the sample time zone 302.

In some cases, the intelligent interface feature system 102 generates the updated graphical visualization 314 to include the one or more of the same interface features as the initial graphical visualization and/or one or more different interface features as the initial graphical visualization, where the interface features are placed in modified locations within the same or different graphical user interfaces. For example, the intelligent interface feature system 102 generates the updated graphical visualization 314 to modify a placement of an interface feature that, based on the client device interactions 308, is associated with at least a threshold number (or frequency) of client device interactions and/or that is associated with more client device interactions than one or more other interface features. Indeed, the intelligent interface feature system 102 generates the updated graphical visualization 314 to include one or more interface features based on selection counts from clicks (and/or counts of other client device interactions). Thus, the intelligent interface feature system 102 surfaces more popular or more effective interface features in more prominent locations, such as higher up in a webpage, more central in a webpage, or earlier in a series or sequence of webpages.

In some embodiments, the feature visualization machine learning model 310 is a collaborative filter recommendation model. In these or other embodiments, the intelligent interface feature system 102 utilizes the feature visualization machine learning model 310 to generate an updated arrangement and/or assortment of interface features. Indeed, the intelligent interface feature system 102 generates the updated graphical visualization 314 by collaborative filtering of client device interactions between the sample time zone 302 (e.g., the client device interactions 308) and the target time zone 304. For example, based on the similarity score 306, the feature visualization machine learning model 310 generates a prediction that (a portion or a percentage of) the client device interactions 308 from the sample time zone 302 are also likely to occur within the target time zone 304. Indeed, the feature visualization machine learning model 310 generates predictions for different arrangements and/or assortments of interface features based on collaborative filtering.

For instance, the feature visualization machine learning model 310 generates a prediction of a graphical visualization for the target time zone 304. The feature visualization machine learning model 310 generates the prediction based on an assumption that, if the sample time zone 302 produced a set of client device interactions for an initial graphical visualization (and the sample time zone 302 and the target time zone 304 are within a threshold similarity), then the target time zone 304 will produce a particular set of client device interactions for a different graphical visualization with a modified arrangement and/or assortment of interface features. Indeed, based on monitoring client device interactions, the feature visualization machine learning model 310 generates or determines relationships between nodes representing interface features and client devices within the sample time zone 302 and/or the target time zone 304. Based on the determined relationships, the intelligent interface feature system 102 fills in, or predicts, client device interactions between nodes that have no actual observed or received data indicating client device interactions, such as predicted client device interactions for different arrangements and/or assortments of interface features from client devices in the target time zone 304.

Based on the determined relationships or other factors, the feature visualization machine learning model 310 accordingly predicts an arrangement and/or assortment of interface features used to generate the updated graphical visualization 314 for the target time zone 304. For example, the intelligent interface feature system 102 generates the updated graphical visualization 314 to surface one or more interface features (e.g., more popular or more effective interface features) in more efficient locations as compared to the initial graphical visualization. Thus, the intelligent interface feature system 102 processes fewer client device interactions from client devices navigating to locate the particular interface features.

As further illustrated in FIG. 3, in some implementations, the intelligent interface feature system 102 generates the updated graphical visualization 314 based on a target performance metric 312. In particular, the intelligent interface feature system 102 receives an indication of the target performance metric 312 from the administrator device 110. For example, the intelligent interface feature system 102 receives an indication to increase views (and/or clicks and/or conversions) for the updated graphical visualization 314 (or for a particular interface feature).

Based on the target performance metric 312 in conjunction with the client device interactions 308, the intelligent interface feature system 102 generates the updated graphical visualization 314. Specifically, the intelligent interface feature system 102 generates the updated graphical visualization 314 to include interface features that are predicted to achieve the target performance metric 312. For instance, the intelligent interface feature system 102 utilizes the feature visualization machine learning model 310 to generate the updated graphical visualization 314 that depicts a combination of one or more interface features in an arrangement and/or an assortment that is predicted to achieve the target performance metric 312.

Figure 4:
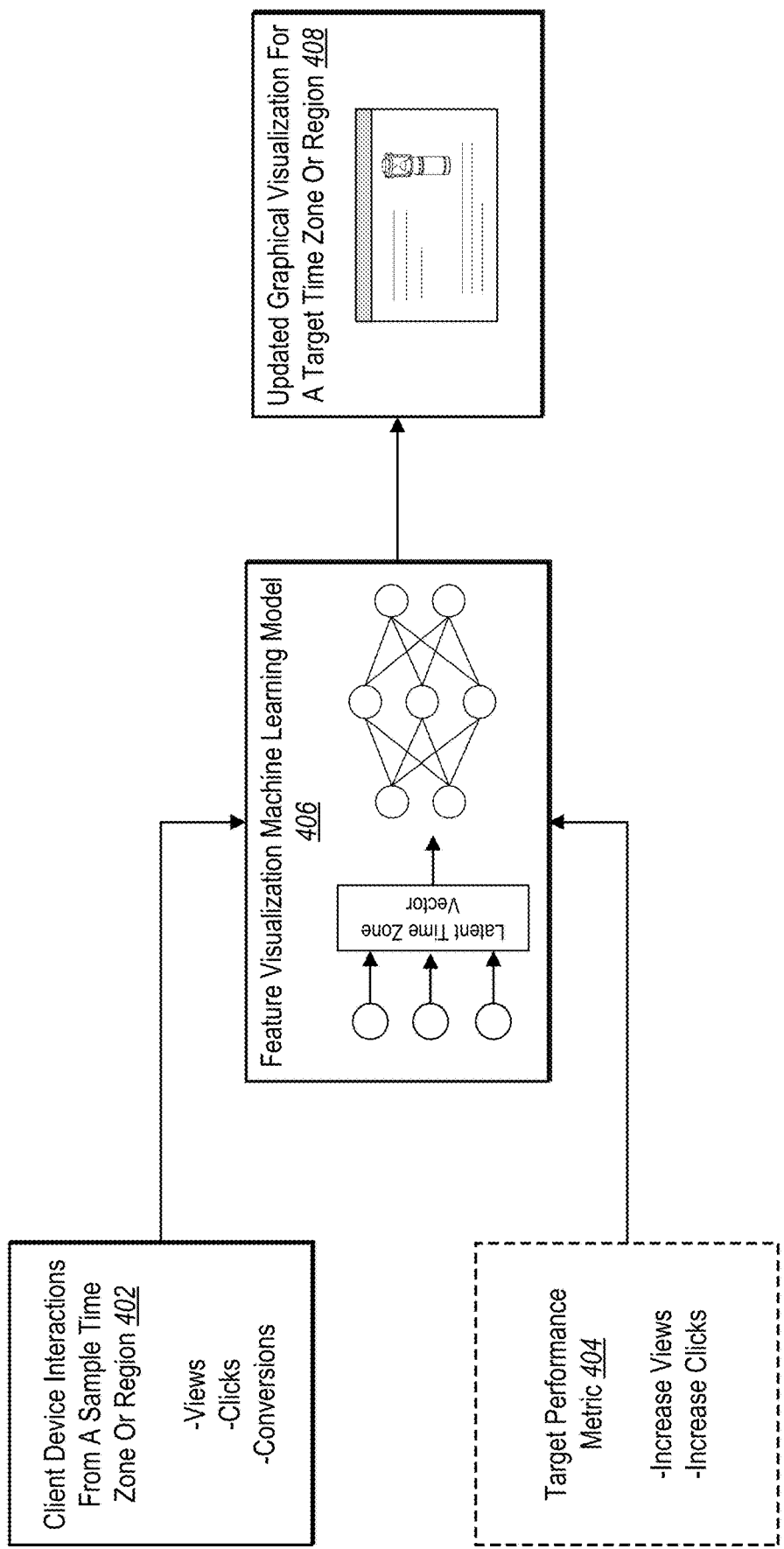
FIG. 4 illustrates an example of the intelligent interface feature system generating an updated graphical visualization utilizing a feature visualization machine learning model in the form of a feature visualization neural network in accordance with one or more embodiments.

As mentioned above, in certain described embodiments, the intelligent interface feature system 102 utilizes a feature visualization machine learning model to predict arrangements and/or assortments of interface features. The intelligent interface feature system 102 further generates an updated graphical visualization for a target time zone or a target geographic region from the predictions of the feature visualization machine learning model. In particular, the intelligent interface feature system 102 utilizes a feature visualization machine learning model in the form of a feature visualization neural network. FIG. 4 illustrates generating an updated graphical visualization utilizing a feature visualization machine learning model in the form of a feature visualization neural network in accordance with one or more embodiments.

As illustrated in FIG. 4, the intelligent interface feature system 102 utilizes a feature visualization machine learning model 406 to generate an updated graphical visualization 408 for a target time zone or a target geographic region (e.g., the target time zone 304). In particular, the feature visualization machine learning model 406 predicts an updated arrangement and/or assortment of interface features based on client device interactions 402. From the updated arrangement and/or assortment, the intelligent interface feature system 102 generates the updated graphical visualization 408 based on client device interactions 402 from a sample time zone or a sample geographic region (e.g., the sample time zone 302). For instance, the feature visualization machine learning model 406 predicts an arrangement and/or assortment of interface features for the updated graphical visualization 408 by processing or analyzing the client device interactions 402 to generate, encode, or extract a latent time zone vector (or a latent geographic region vector) from the client device interactions 402.

Specifically, the feature visualization machine learning model 406 generates latent vector representations of client device interactions utilizing one or more neurons within one or more network layers of the feature visualization machine learning model 406. Indeed, the feature visualization machine learning model 406 generates the latent vector representations to include within the latent time zone vector representing the client device interactions 402 from the sample time zone (or the same geographic region) as a whole. In some cases, the latent time zone vector includes numerical or mathematical representations of the client device interactions 402 that are not necessarily interpretable by a human observer but are nonetheless interpretable by the feature visualization machine learning model 406 and that represent the client device interactions 402.

From the latent time zone vector, the intelligent interface feature system 102 further generates the updated graphical visualization 408. More particularly, the intelligent interface feature system 102 utilizes (one or more additional layers of) the feature visualization machine learning model 406 to further process the latent time zone vector and generate the updated graphical visualization 408. Indeed, the intelligent interface feature system 102 generates, from a predicted arrangement and/or assortment of interface features, the updated graphical visualization 408 that reflects an arrangement and/or assortment of interface features to surface more popular and/or more effective interface features in different (e.g., more prominent, more efficient) locations.

In some cases, the intelligent interface feature system 102 utilizes arrangement and/or assortment predictions from the feature visualization machine learning model 406 to generate the updated graphical visualization 408 from the client device interactions 402 as well as a target performance metric 404 (e.g., the target performance metric 312). For example, the feature visualization machine learning model 406 utilizes the target performance metric 404 to generate one or more weights or biases associated with various layers or neurons within the feature visualization machine learning model 406. Based on modifying the weights and biases according to the target performance metric 404, the intelligent interface feature system 102 adjusts how the feature visualization machine learning model 406 processes and passes data to therefore modify the output updated graphical visualization 408. Indeed, the intelligent interface feature system 102 utilizes the target performance metric 404 to instruct the feature visualization machine learning model 406 (through the modified weights and biases) to generate an updated graphical visualization 408 that is predicted to achieve the target performance metric 404 (as informed by the client device interactions 402).

While FIGS. 3-4 describe client device interactions from a single sample time zone or sample geographic region, in some embodiments, the intelligent interface feature system 102 generates an updated graphical visualization based on client device interactions from multiple sample time zones or sample geographic regions. For example, the intelligent interface feature system 102 identifies two or more leading time zones that precede the target time zone 304 and determines client device interactions from the two or more leading time zones for input into the feature visualization machine learning model 310 or 406. As another example, the intelligent interface feature system 102 determines, for input into the feature visualization machine learning model 310 or 406, client device interactions from two or more sample geographic regions with at least a threshold similarity score in relation to a target geographic region. In some cases, the intelligent interface feature system 102 generates a set of combined client device interactions by generating a weighted combination of the client device interactions from each of the two or more leading time zones (or two or more geographic regions).

For instance, the intelligent interface feature system 102 weights client device interactions from leading time zones that are closer in time (e.g., more immediately preceding) the target time zone more heavily. Additionally (or alternatively), the intelligent interface feature system 102 weights client device interactions from sample time zones or sample geographic regions based on similarity scores in relation to the target time zone or the target region (e.g., where those with higher similarity scores are weighted more heavily). In turn, the feature visualization machine learning model 310 or 406 generates an updated graphical visualization based on the combined client device interactions from the two or more leading time zones.

In some embodiments, the intelligent interface feature system 102 performs a step for generating an updated graphical visualization comprising one or more interface features from among the set of interface features for a target time zone. The above description of acts 206-212 of FIG. 2, including the more detailed descriptions in support of acts 206-212 provided in relation to FIGS. 3-4, provide various embodiments and supporting acts and algorithms for performing a step for generating an updated graphical visualization comprising one or more interface features from among the set of interface features for a target time zone.

For example, in some embodiments, performing a step for generating an updated graphical visualization comprising one or more interface features from among the set of interface features for a target time zone includes detecting or determining client device interactions from client devices located within a sample time zone (e.g., as described in relation to FIG. 3). In some embodiments, performing a step for generating an updated graphical visualization comprising one or more interface features from among the set of interface features for a target time zone also includes utilizing a feature visualization machine learning model to generate an updated graphical visualization for a target time zone from the client device interactions of the sample time zone (e.g., as described in relation to FIGS. 3-4).

Figure 5:
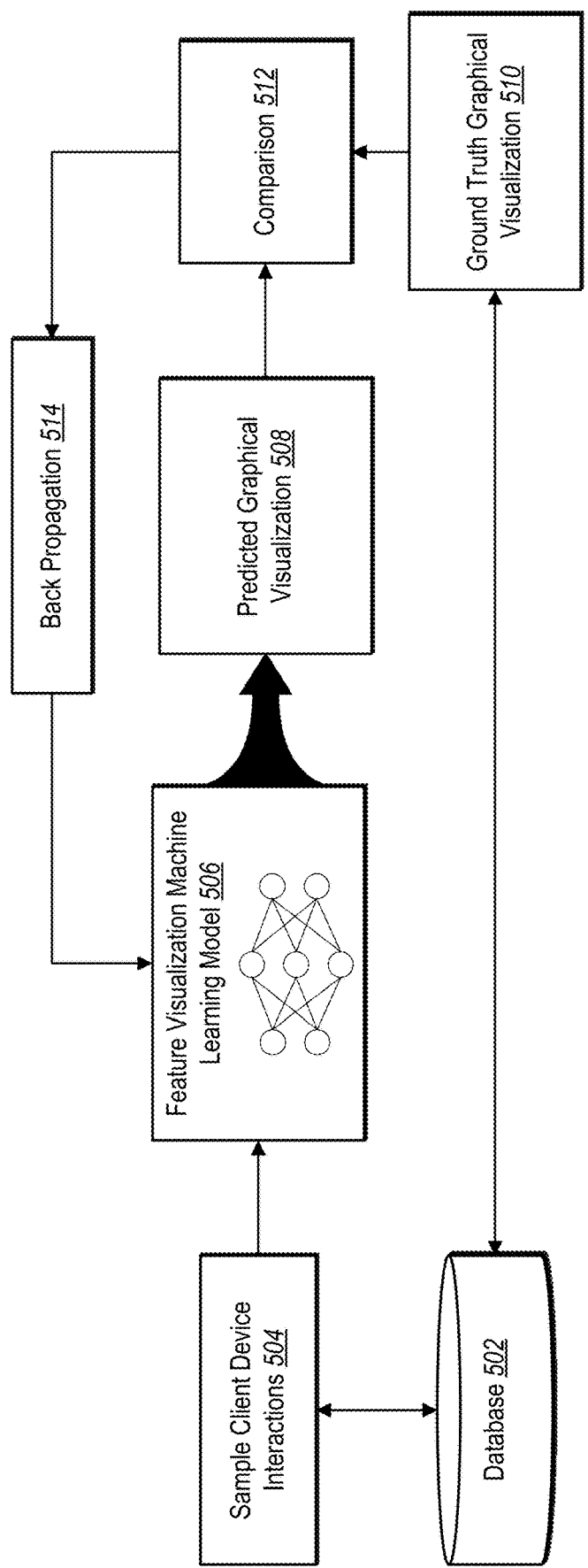
FIG. 5 illustrates an example process of the intelligent interface feature system training a feature visualization machine learning model in accordance with one or more embodiments.

In one or more embodiments, the intelligent interface feature system 102 trains a feature visualization machine learning model (e.g., the feature visualization machine learning model 310 or 406) to predict arrangements and/or assortments of interface features (e.g., for an updated graphical visualization). In particular, the intelligent interface feature system 102 trains a feature visualization neural network based on sample client device interactions and corresponding ground truth graphical visualizations. FIG. 5 illustrates training a feature visualization machine learning model in the form of a feature visualization neural network in accordance with one or more embodiments.

As illustrated in FIG. 5, the intelligent interface feature system 102 performs an iterative training process to improve the accuracy of a feature visualization machine learning model 506. For example, the intelligent interface feature system 102 retrieves or accesses a set of sample client device interactions 504 from a database 502 (e.g., the database 112). In addition, the intelligent interface feature system 102 inputs the sample client device interactions into the feature visualization machine learning model 506. In turn, the feature visualization machine learning model 506 generates a predicted graphical visualization 508 from the sample client device interactions 504. For instance, the feature visualization machine learning model 506 generates a sample feature vector from the sample client device interactions 504 and further processes the sample feature vector utilizing additional layers and neurons to generate an output in the form of the predicted graphical visualization 508.

As further illustrated in FIG. 5, the intelligent interface feature system 102 also performs a comparison 512 between the predicted graphical visualization 508 and a ground truth graphical visualization 510. To elaborate, the intelligent interface feature system 102 accesses or retrieves a ground truth graphical visualization 510 from the database 502, where the ground truth graphical visualization 510 corresponds to, or depicts the actual assortment and arrangement of interface features that resulted in or elicited, the sample client device interactions 504. Additionally, the intelligent interface feature system 102 compares the ground truth graphical visualization 510 with the predicted graphical visualization 508.

To perform the comparison 512, in some embodiments, the intelligent interface feature system 102 utilizes a loss function such as a mean square error loss function or a cross entropy loss function to determine a measure of loss between the predicted graphical visualization 508 and the ground truth graphical visualization 510. Based on the comparison 512, the intelligent interface feature system 102 further performs a back propagation 514. In particular, the intelligent interface feature system 102 back propagates to modify internal parameters of the feature visualization machine learning model 506 such as weights and biases. By modifying the weights and biases, the intelligent interface feature system 102 adjusts how the feature visualization machine learning model 506 processes and passes information to reduce the measure of loss determined via the comparison 512.

In addition, the intelligent interface feature system 102 repeats the process illustrated in FIG. 5 for multiple iterations or epochs until the feature visualization machine learning model 506 generates a predicted graphical visualization that satisfies a threshold measure of loss (or a threshold accuracy). For instance, for each iteration, the intelligent interface feature system 102: i) accesses a set sample client device interactions, ii) utilizes the feature visualization machine learning model 506 to generate a predicted graphical visualization from the sample client device interactions, iii) compares (via a loss function) the predicted graphical visualization with a ground truth graphical visualization that corresponds to the sample client device interactions of the respective iteration, and iv) back propagates to reduce the measure of loss by modifying parameters of the feature visualization machine learning model 506. By utilizing the iterative training process, the intelligent interface feature system 102 generates accurate updated graphical visualizations for display on client devices within a target time zone or a target geographic region.

As mentioned above, in one or more embodiments, the intelligent interface feature system 102 determines a sequence of geographic regions for rolling out an interface feature. In particular, the intelligent interface feature system 102 determines an order of geographic regions in which to provide one or more interface features for display within an updated graphical visualization to, for example, achieve a target performance metric. FIGS. 6A-6B illustrate determining an order of geographic regions for rolling out one or more interface features in accordance with one or more embodiments.

As illustrated in FIG. 6A, the intelligent interface feature system 102 determines or identifies a plurality of geographic regions. For example, the intelligent interface feature system 102 identifies geographic regions defined by geographic coordinates, geohashes, demographic information, digital content interests, and/or time zones. In some cases, the intelligent interface feature system 102 identifies geographic regions in the form of digital content distribution regions where, for example, areas in the northeast United States receive different digital content than areas in the southeast United States due to differences in geography, demographics, and content interests. As shown, the intelligent interface feature system 102 identifies three different geographic regions: Region 1, Region 2, and Region 3.

Based on identifying the geographic regions, the intelligent interface feature system 102 generates a plurality of candidate orders of the geographic regions. To elaborate, the intelligent interface feature system 102 generates a candidate order by selecting an initial geographic region and generating a similarity chain stemming from the initial geographic region. For example, the intelligent interface feature system 102 determines similarity scores between the initial geographic region and every other geographic region.

Indeed, as described above, the intelligent interface feature system 102 determines similarity scores based on historical network user behavior indicating client device interactions with particular interface features and/or other digital content. The intelligent interface feature system 102 determines similarity scores based on other or additional factors, such as user demographics within the regions, time zone similarities between the regions, and/or language similarities between the regions. The intelligent interface feature system 102 further selects a geographic region with a highest similarity score in relation to the initial geographic region as a subsequent geographic region immediately following the initial geographic region in the order.

The intelligent interface feature system 102 further links additional subsequent geographic regions to the ordered similarity chain. For example, the intelligent interface feature system 102 determines similarity scores for each geographic region in relation to the subsequent geographic region that follows the initial geographic region. Based on the similarity scores, the intelligent interface feature system 102 selects an additional subsequent geographic region for immediately following the subsequent geographic region. Indeed, the intelligent interface feature system 102 selects the additional subsequent geographic region as a geographic region with a next-highest (or highest available) similarity score in relation to the subsequent geographic region (e.g., the highest similarity score after that of the initial geographic region). The intelligent interface feature system 102 continues to link geographic regions in the order by determining similarity scores (in relation to each successively added geographic region) and selecting those regions with highest available similarity scores to append to the ordered similarity chain.

As shown in FIG. 6A, the intelligent interface feature system 102 determines a similarity score of 0.85 (e.g., on a scale from 0 to 1) between Region 1 and Region 2. To determine the similarity score, the intelligent interface feature system 102 compares historical network user behavior of Region 1 with historical network user behavior of Region 2, including a comparison of client device interaction type, numbers (or frequencies) of each type, and/or timing of client device interactions in relation to various interface features or other digital content. Based on comparing historical network user behavior (in addition to other information mentioned above such as demographics), the intelligent interface feature system 102 determines the similarity score of 0.85 between Region 1 and Region 2.

Additionally, the intelligent interface feature system 102 determines a similarity score between Region 1 and Region 3, where the similarity score is lower than 0.85. Thus, the intelligent interface feature system 102 selects Region 2 as a subsequent Region from the initial Region 1 in the depicted candidate. Further, the intelligent interface feature system 102 determines a similarity score of 0.70 between Region 2 and Region 3 based on comparing the client device interaction information of the respective regions. Because the similarity score of 0.70 is lower the highest available similarity score of remaining regions in relation to Region 2, the intelligent interface feature system 102 appends Region 3 to the candidate order after Region 2.

In one or more embodiments, the intelligent interface feature system 102 distributes or provides an interface feature for display on client devices located within each of the successive geographic regions of the candidate order in turn. Specifically, the intelligent interface feature system 102 generates an initial graphical visualization including the interface feature for display on client device in Region 1 (e.g., the initial region). Subsequently, the intelligent interface feature system 102 generates an updated graphical visualization from client device interactions (in relation to the interface feature of the graphical visualization) of Region 1 utilizing a feature visualization machine learning model, as described herein, to include a modified presentation of the interface feature for display on client devices located in Region 2. Further, the intelligent interface feature system 102 generates another updated graphical visualization from client device interactions of Region 2 (and/or Region 1) for display on client devices in Region 3.

As illustrated in FIG. 6A, the intelligent interface feature system 102 tracks or received data indicating user device network behavior with respect to the interface feature. For Region 1, the intelligent interface feature system 102 determines 8 clicks and 10 views (in relation to the interface feature) from User A and 15 clicks and 20 views from User B. Additionally, for Region 2, the intelligent interface feature system 102 determines 7 clicks and 10 views for User C and 14 clicks and 18 views for User D. Further, for Region 3, the intelligent interface feature system 102 determines 5 clicks and 9 views for User E and 13 clicks and 30 views for User F.

As illustrated in FIG. 6B, the intelligent interface feature system 102 generates another candidate order of geographic regions. More particularly, the intelligent interface feature system 102 selects or identifies a different initial region for the new candidate order. For example, the intelligent interface feature system 102 selects Region 2 as the initial geographic region. In addition, the intelligent interface feature system 102 selects Region 1 as a subsequent geographic region immediately following Region 2 based on comparing similarity scores of geographic regions in relation to Region 2. Indeed, Region 1 has a similarity score of 0.85 in relation to Region 1. In addition, the intelligent interface feature system 102 compares similarity scores of geographic regions to select the geographic region with the highest available similarity score to follow Region 1. As shown, the intelligent interface feature system 102 selects Region 3 to follow Region 1 based on a similarity score of 0.6.

Similar to the above description in relation to FIG. 6A, the intelligent interface feature system 102 distributes an interface feature according to the candidate order of FIG. 6B. To elaborate, the intelligent interface feature system 102 generates a graphical visualization including an interface feature for display on client devices in Region 2 (e.g., the initial region). The intelligent interface feature system 102 further determines client device interactions in relation to the interface feature for Region 2 (e.g., 7 clicks and 10 views from User C and 14 clicks and 18 views from User D) and generates, utilizing a feature visualization machine learning model, an updated graphical visualization from the client device interactions for Region 1 (e.g., the subsequent geographic region). Further, the intelligent interface feature system 102 determines client device interactions from Region 1 (e.g., 10 clicks and 10 views from User A and 15 clicks and 22 views from User B) and generates, from the client device interactions of Region 1 utilizing the feature visualization machine learning model, another updated graphical visualization including the interface feature for Region 3.

As illustrated in FIGS. 6A-6B, the intelligent interface feature system 102 determines performance metrics for the candidate orders. For example, the intelligent interface feature system 102 determines a number of client device interactions, such as clicks, view, scrolls, and/or conversions that reflect how the interface feature performed when sequentially distributed in each of the candidate orders. As shown, the intelligent interface feature system 102 determines 62 total clicks and 97 total views (associated with the interface feature) for the candidate order of FIG. 6A. As also shown, the intelligent interface feature system 102 determines 66 total clicks and 102 total views (associated with the interface feature) for the candidate order of FIG. 6B.

Based on the performance metrics of the different candidate orders, the intelligent interface feature system 102 learns how to select the initial region. To elaborate, based on generating and testing different candidate orders over time, the intelligent interface feature system 102 learns which geographic regions will result in an order or similarity chain that will achieve a particular performance metric. Indeed, in some cases, the intelligent interface feature system 102 selects an order from among multiple candidate orders (e.g., the candidate orders illustrated in FIGS. 6A-6B) to utilize for rolling out or distributing an interface feature based on the performance metrics.

For example, the intelligent interface feature system 102 selects an order based on comparing performance metrics with a target performance metric. As described, the intelligent interface feature system 102 receives an indication of a target performance metric from the administrator device 110. In some cases, the intelligent interface feature system 102 receives a target performance metric to increase client device interactions, such as clicks, views, scrolls, and/or conversions. As mentioned, the intelligent interface feature system 102 determines a total click count of 62 and a total view count of 97 for the first candidate order. As shown in FIG. 6B, the intelligent interface feature system 102 determines a total click count of 66 and a total view count of 102 for the second candidate order. Thus, based on a target performance metric to increase client device interactions (e.g., clicks and/or views), the intelligent interface feature system 102 selects the candidate order illustrated in FIG. 6B for distributing an interface feature. Indeed, the intelligent interface feature system 102 selects the candidate order of FIG. 6B to increase clicks and views.

Figure 7B:
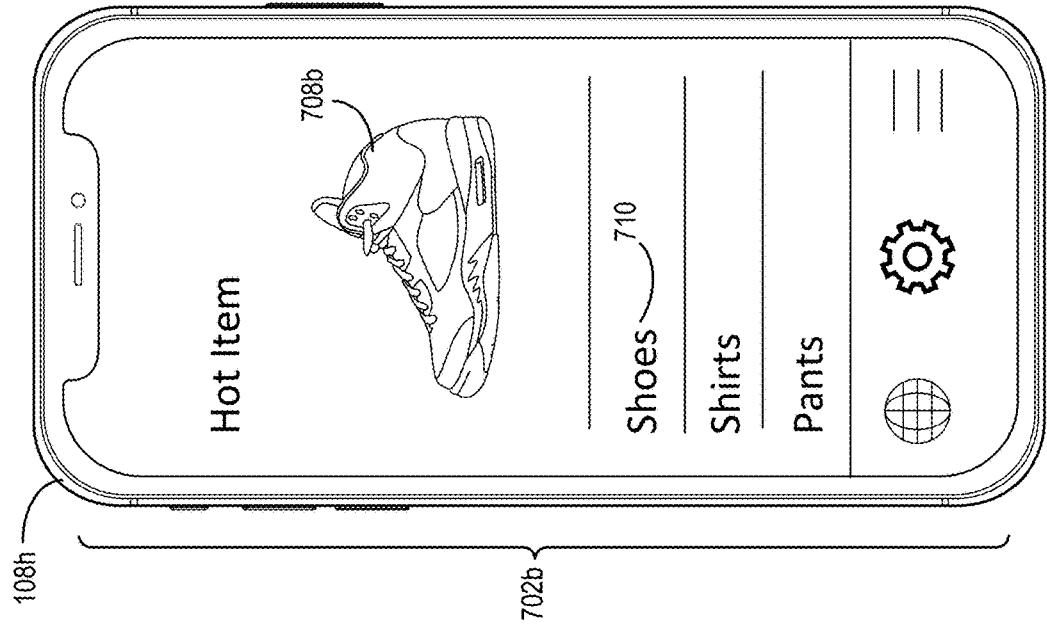
FIGS. 7A-7B illustrates an example comparison of a graphical visualization and an updated graphical visualization in accordance with one or more embodiments.
Figure 7A:
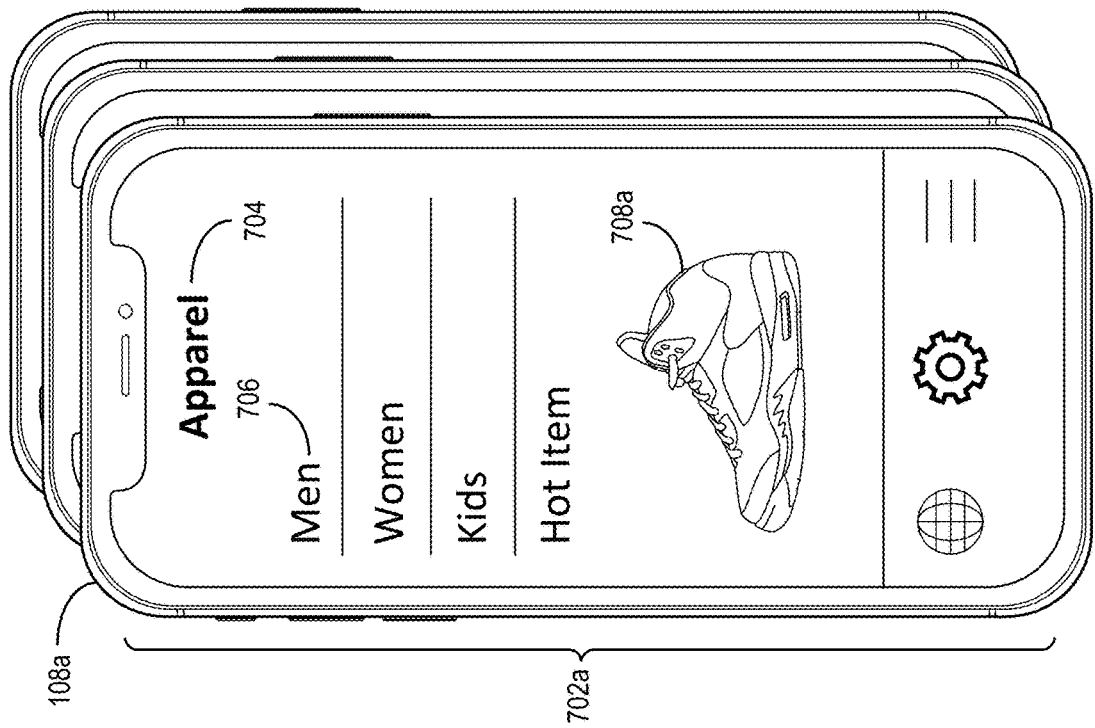

As mentioned above, in certain described embodiments, the intelligent interface feature system 102 generates an updated graphical visualization to modify an arrangement and/or an assortment of interface features. In particular, the intelligent interface feature system 102 generates an updated graphical visualization to select and place one or more interface features in different locations as compared to an initial graphical visualization. FIGS. 7A-7B illustrate a comparison between an initial graphical visualization and an updated graphical visualization in accordance with one or more embodiments.

As illustrated in FIG. 7A, the intelligent interface feature system 102 generates and provides a graphical visualization 702a for display on a graphical user interface of the client device 108a. As shown, the graphical visualization 702a includes interface features such as the title 704, the selectable menu option 706, and the selectable digital image 708a. In some cases, the graphical visualization 702a includes additional interface features not shown in FIG. 7A, but that are instead nested within other graphical user interfaces. For instance, based on a selection of the selectable menu option 706, the intelligent interface feature system 102 provides a different graphical user interface for display as part of the graphical visualization 702a, which includes products for "Men."

Indeed, in some embodiments, the graphical visualization 702a is displayed over multiple graphical user interfaces, as shown by the nested versions of the client device 108a in FIG. 7A. In these or other embodiments, to access a particular interface feature, the user of the client device 108a navigates through multiple interface layers across a plurality of graphical user interfaces. In response to determining that the particular interface feature is popular (e.g., based on a threshold number of client device interactions), the intelligent interface feature system 102 generates an updated graphical visualization to surface the interface feature in a more prominent location, without requiring navigation across multiple graphical user interfaces to access.

Along these lines, FIG. 7B illustrates an updated graphical visualization 702b displayed on a graphical user interface of a client device 108h and that includes one or more interface features with modified arrangement and/or assortment from the graphical visualization 702a. Indeed, the updated graphical visualization 702b includes an assortment of different interface features than those depicted in the graphical visualization 702a. Specifically, the updated graphical visualization 702b includes a digital image 708b and a selectable menu option 710 (among others). As mentioned above, based on detecting a threshold number of client device interactions with the selectable menu option 710 for "Shoes," the intelligent interface feature system 102 generates the updated graphical visualization 702b to provide the selectable menu option 710 up front (e.g., without requiring navigation through other graphical user interfaces to access it). In addition, the intelligent interface feature system 102 provides the digital image 708b in a more prominent location than the digital image 708a in the initial graphical visualization 702a.

In some embodiments, the intelligent interface feature system 102 provides the graphical visualization 702a for display on the client device 108a located in a sample time zone or an initial geographic region and provides the updated graphical visualization 702b for display on the client device 108h located in a target time zone or a subsequent geographic region. Indeed, as described herein, the intelligent interface feature system 102 determines client device interactions in relation to the interface features of the graphical visualization 702a and then generates the updated graphical visualization 702b from the client device interactions utilizing a feature visualization machine learning model (e.g., the feature visualization machine learning model 310 or 406).

In addition to the modification of interface features illustrated in FIGS. 7A-7B, the intelligent interface feature system 102 can modify interface features in other ways as well. For example, in some embodiments, the intelligent interface feature system 102 generates the updated graphical visualization 702b to depict the digital image 708b in a different color than the digital image 708a based on detecting client device interactions with various colored versions of the digital image 708a (e.g., to select a most popular color). In some cases, the intelligent interface feature system 102 modifies other interface features, such as product descriptions. For example, based on client device interactions within the graphical visualization 702a, the intelligent interface feature system 102 determines that shorter (or longer) product descriptions are more effective at eliciting client device interactions. Thus, the intelligent interface feature system 102 generates a shorter (or longer) product description for a product within the updated graphical visualization 702b.

In some cases, the intelligent interface feature system 102 modifies product descriptions, titles, or other interface features based on adapting language. For example, the intelligent interface feature system 102 determines, based on client device interactions with the graphical visualization 702a, words that are more effective at eliciting client device interactions with respect to product descriptions, titles, banners, or other interface elements. Thus, the intelligent interface feature system 102 generates modified interface elements to include within the updated graphical visualization 702b by changing the language of the interface elements to use more effective words.

Figure 8:
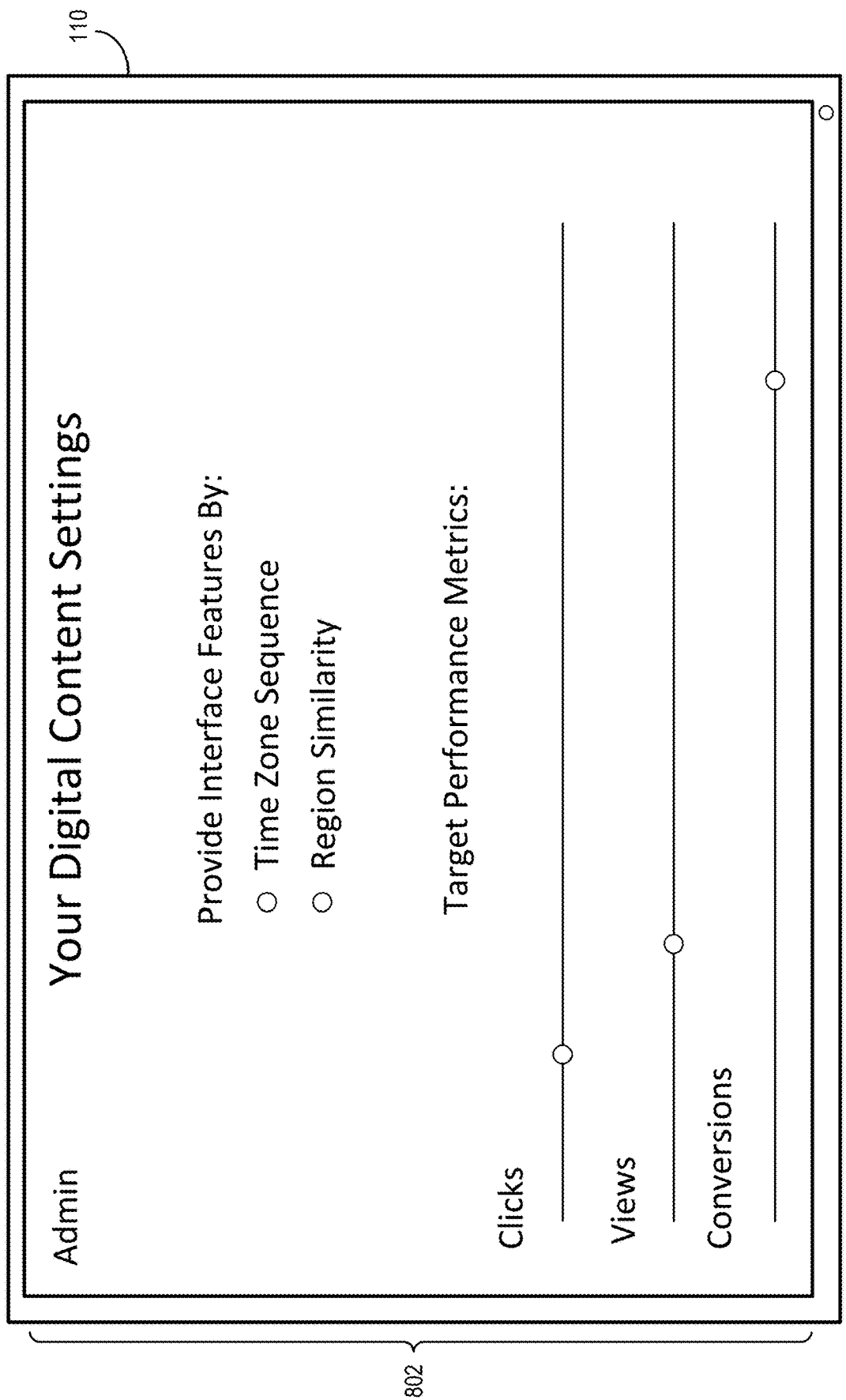
FIG. 8 illustrates an example digital content distribution settings interface in accordance with one or more embodiments.

As mentioned above, in some embodiments, the intelligent interface feature system 102 receives digital content distribution settings from an administrator device (e.g., the administrator device 110). In particular, the intelligent interface feature system 102 provides a graphical user interface such as a digital content distribution settings interface whereby an administrator sets parameters for distributing updated graphical visualizations to various target time zones or target geographic regions. FIG. 8 illustrates an example digital content distribution settings interface in accordance with one or more embodiments.

As illustrated in FIG. 8, the administrator device 110 displays or presents the digital content distribution settings interface 802. Within the digital content distribution settings interface 802, the intelligent interface feature system 102 provides various interactive or selectable elements for modifying how graphical visualizations are distributed to client devices. For example, the intelligent interface feature system 102 provides selectable options (e.g., radio buttons) for distributing updated graphical visualizations including one or more interface features by time zone sequence or by region similarity. Based on a selection to distribute in accordance with a time zone sequence, the intelligent interface feature system 102 performs the methods described herein to determine client device interactions from a sample time zone and generate an updated graphical visualization for a target time zone based on the client device interactions.

Alternatively, based on a selection of the option to distribute graphical visualizations by region similarity, the intelligent interface feature system 102 performs the methods described herein to identify an initial geographic region, generate an order of geographic regions based on similarity scores between regions, and generate one or more updated graphical visualizations for sequential distribution to the geographic regions in the order based on client device interactions from the regions (e.g., where the actions from one or more preceding regions affects the generation of the next updated graphical visualization for the subsequent region).

As further illustrated in FIG. 8, the digital content distribution settings interface 802 includes options for modifying one or more target performance metrics. For example, the digital content distribution settings interface 802 includes a slider bar for adjusting a measure of influence, or a weight, for each of a number of client device interaction types. As shown, the digital content distribution settings interface 802 includes an option to adjust an emphasis for clicks, an option to adjust an emphasis for views, and an option to adjust an emphasis for conversions (e.g., where sliding to the left decreases emphasis and sliding to the right increases emphasis).

Indeed, in some embodiments, the intelligent interface feature system 102 generates a combined target performance metric that includes a weighted combination of the different types of client device interactions accordance with the settings set via the administrator device 110. As shown in FIG. 8, the digital content distribution settings interface 802 indicates a low emphasis for clicks, a slightly higher emphasis for views, and a strong emphasis for conversions. Based on the target performance metrics, the intelligent interface feature system 102 generates a combined target performance metric by generating a weighted combination in accordance with the emphasis levels (e.g., a low weight for clicks, a slightly higher weight for views, and a heavy weight for conversions). Additionally, the intelligent interface feature system 102 generates updated graphical visualizations as described herein to present interface features with assortments and/or arrangements that are predicted to achieve the target performance metrics (e.g., the combined target performance metric).

Figure 9:
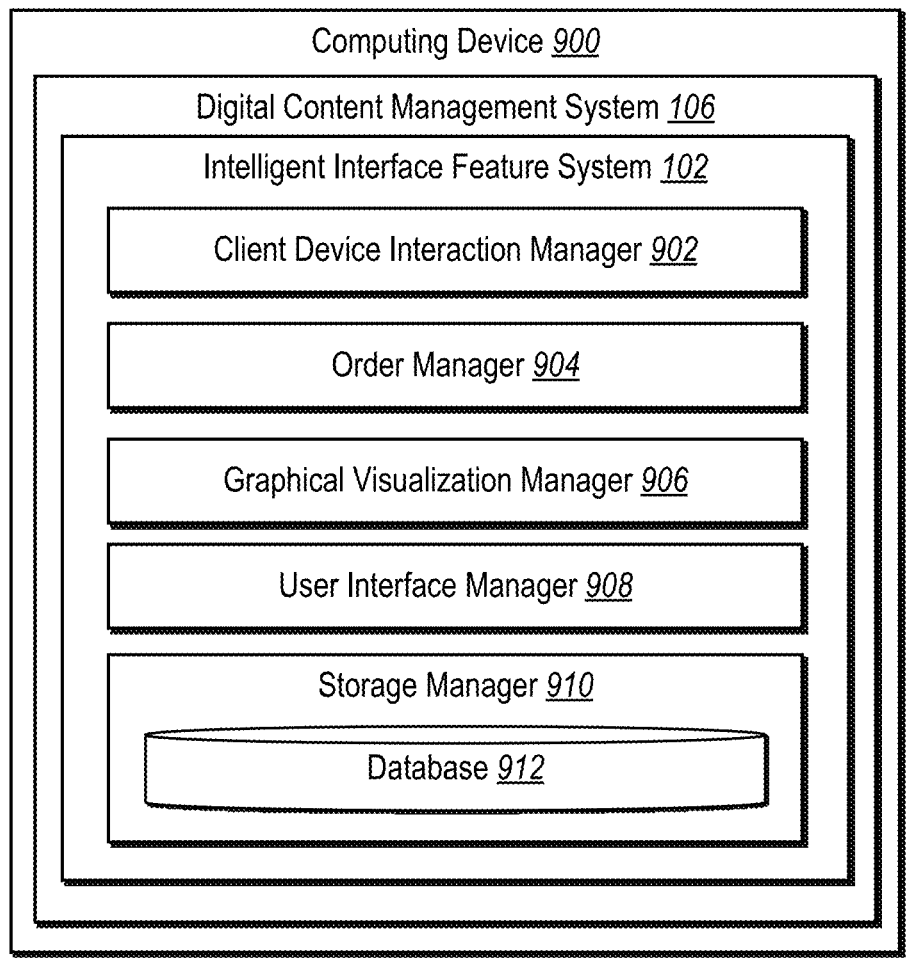
FIG. 9 illustrates a schematic diagram of a computing device for an intelligent interface feature system in accordance with one or more embodiments.

Looking now to FIG. 9, additional detail will be provided regarding components and capabilities of the intelligent interface feature system 102. Specifically, FIG. 9 illustrates an example schematic diagram of the intelligent interface feature system 102 on an example computing device 900 (e.g., one or more of the client devices 108a-108n, the administrator device 110, and/or the server(s) 104). As shown in FIG. 9, the intelligent interface feature system 102 includes a client device interaction manager 902, an order manager 904, a graphical visualization manager 906, a user interface manager 908, and a storage manager 910.

As just mentioned, the intelligent interface feature system 102 includes a client device interaction manager 902. In particular, the client device interaction manager 902 manages, maintains, determines, tracks, monitors, detects, or identifies client device interactions. For example, the client device interaction manager 902 determines client device interactions from client devices located within one or more time zone or geographic regions, such as a sample time zone, a target time zone, a sample geographic region, or a target geographic region. The client device interaction manager 902 also determines client device interactions in relation to particular interface features displayed within a graphical visualization, attributing (portions of) client device interactions to interface features to determine which are more popular or more effective (e.g., which elicit more interaction).

In addition, the intelligent interface feature system 102 includes an order manager 904. In particular, the order manager 904 manages, maintains, determines, arranges, organizes, generates, or identifies an order or a sequence of geographic regions. For example, the order manager 904 determines an order of geographic regions by generating a similarity chain based on similarity scores as described herein. Indeed, the order manager 904 determines or selects an order of geographic regions in which to roll out an interface feature within a graphical visualization to improve or increase a particular target metric. For instance, the order manager 904 determines similarity scores between geographic regions (or time zones). In addition, the order manager 904 links the geographic regions based on similarity scores and surfaces an interface feature to client devices located in each successive geographic region in turn.

As shown, the intelligent interface feature system 102 also includes a graphical visualization manager 906. In particular, the graphical visualization manager 906 manages, maintains, arranges, generates, or creates graphical visualizations. For example, the graphical visualization manager 906 generates an updated graphical visualization utilizing a feature visualization machine learning model based on client device interactions as described herein. Indeed, the graphical visualization manager 906 generates an updated graphical visualization for a target time zone or a target geographic region based on client device interactions from a sample time zone or a sample geographic region.

Additionally, the intelligent interface feature system 102 includes a user interface manager 908. In particular, the user interface manager 908 presents, displays, or provides graphical visualizations for display. For example, the user interface manager 908 provides an initial graphical visualization (e.g., in the form of one or more graphical user interfaces) for display on client devices in a sample time zone or a sample geographic region. In addition, the user interface manager 908 provides an updated graphical visualization for display on client devices in a target time zone or a target geographic region. In some cases, the user interface manager 908 provides an updated graphical visualization that depicts one or more interface features in a modified arrangement and/or assortment (e.g., to reduce client device interactions and/or to achieve a target performance metric).

The intelligent interface feature system 102 further includes a storage manager 910. The storage manager 910 operates in conjunction with, or includes, one or more memory devices such as the database 912 (e.g., the database 112) that store various data such as a feature visualization machine learning model, client device interaction data, interface feature data, historical network user behavior data, time zone data defining different time zones, and geographic data defining different geographic regions.

In one or more embodiments, each of the components of the intelligent interface feature system 102 are in communication with one another using any suitable communication technologies. Additionally, the components of the intelligent interface feature system 102 is in communication with one or more other devices including one or more client devices described above. It will be recognized that although the components of the intelligent interface feature system 102 are shown to be separate in FIG. 9, any of the subcomponents may be combined into fewer components, such as into a single component, or divided into more components as may serve a particular implementation. Furthermore, although the components of FIG. 9 are described in connection with the intelligent interface feature system 102, at least some of the components for performing operations in conjunction with the intelligent interface feature system 102 described herein may be implemented on other devices within the environment.

The components of the intelligent interface feature system 102 can include software, hardware, or both. For example, the components of the intelligent interface feature system 102 can include one or more instructions stored on a computer-readable storage medium and executable by processors of one or more computing devices (e.g., the computing device 900). When executed by the one or more processors, the computer-executable instructions of the intelligent interface feature system 102 can cause the computing device 900 to perform the methods described herein. Alternatively, the components of the intelligent interface feature system 102 can comprise hardware, such as a special purpose processing device to perform a certain function or group of functions. Additionally, or alternatively, the components of the intelligent interface feature system 102 can include a combination of computer-executable instructions and hardware.

Furthermore, the components of the intelligent interface feature system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the intelligent interface feature system 102 may be implemented as part of a stand-alone application on a personal computing device or a mobile device. Alternatively, or additionally, the components of the intelligent interface feature system 102 may be implemented in any application that allows creation and delivery of marketing content to users, including, but not limited to, applications in ADOBE® MARKETING CLOUD®, such as ADOBE CAMPAIGN® and ADOBE ANALYTICS®. "ADOBE," "ADOBE MARKETING CLOUD," "ADOBE CAMPAIGN," and "ADOBE ANALYTICS" are either registered trademarks or trademarks of Adobe Inc. in the United States and/or other countries.

FIGS. 1-9 the corresponding text, and the examples provide a number of different systems, methods, and non-transitory computer readable media for generating an updated graphical visualization for a target time zone or a target geographic region utilizing a feature visualization machine learning model based on client device interactions from a sample time zone or a sample geographic region. In addition to the foregoing, embodiments can also be described in terms of flowcharts comprising acts for accomplishing a particular result. For example, FIGS. 10-11 illustrate flowcharts an example sequences or series of acts in accordance with one or more embodiments.

Figure 10:
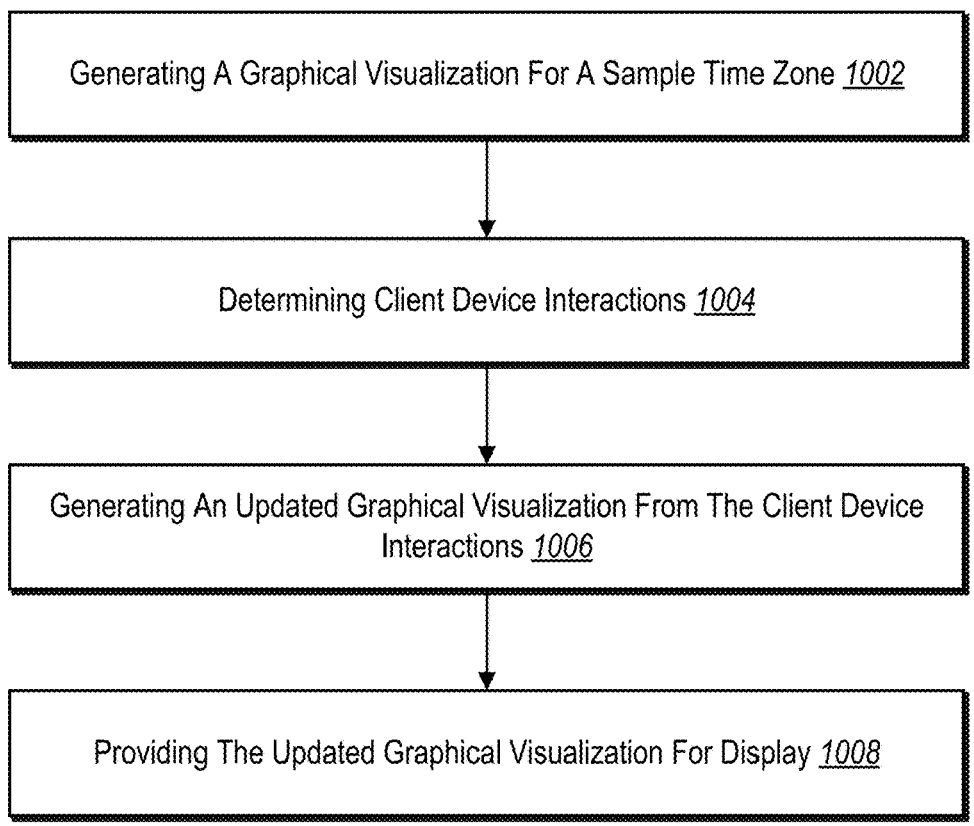
FIG. 10 illustrates a flowchart of a series of acts for generating an updated graphical visualization for a target time zone utilizing a feature visualization machine learning model based on client device interactions from a sample time zone in accordance with one or more embodiments.
Figure 11:
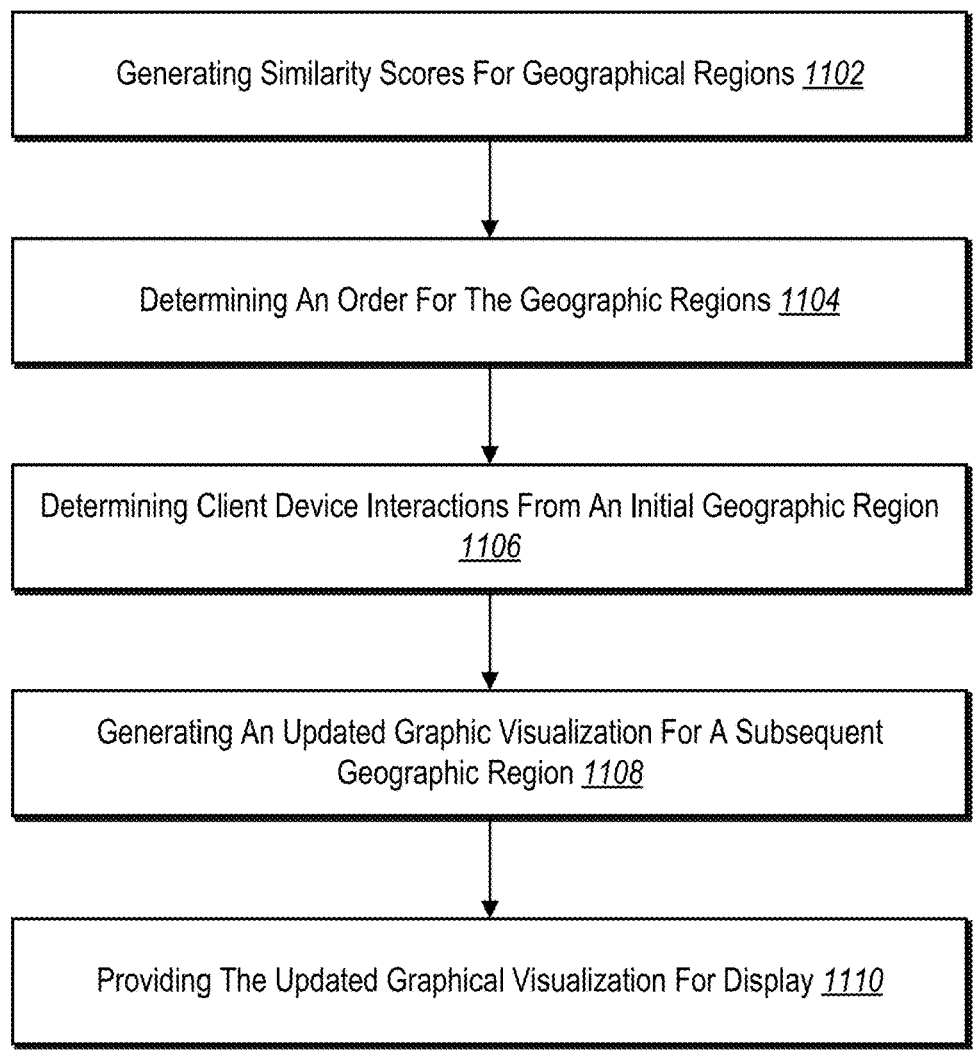
FIG. 11 illustrates a flowchart of a series of acts for generating an updated graphical visualization for an order of geographic regions utilizing a feature visualization machine learning model based on client device interactions in accordance with one or more embodiments.

While FIGS. 10-11 illustrate acts according to particular embodiments, alternative embodiments may omit, add to, reorder, and/or modify any of the acts shown in FIGS. 10-11. The acts of FIGS. 10-11 can be performed as part of a method. Alternatively, a non-transitory computer readable medium can comprise instructions, that when executed by one or more processors, cause a computing device to perform the acts of FIGS. 10-11. In still further embodiments, a system can perform the acts of FIGS. 10-11. Additionally, the acts described herein may be repeated or performed in parallel with one another or in parallel with different instances of the same or other similar acts.

FIG. 10 illustrates an example series of acts 1000 for generating an updated graphical visualization for a target time zone utilizing a feature visualization machine learning model based on client device interactions from a sample time zone. In particular, the series of acts 1000 includes an act 1002 of generating a graphical visualization for a sample time zone. For example, the act 1002 involves generating, for display within one or more graphical user interfaces of a plurality of client devices located in a sample time zone, a graphical visualization of the set of interface features. In some embodiments, the act 1002 involves generating the graphical visualization to include the set of interface features across multiple graphical user interfaces in response to client device interactions to navigate across the multiple graphical user interfaces. In certain cases, the act 1002 involves generating one or more of an arrangement or an assortment of the set of interface features for the sample time zone preceding the target time zone.

As shown, the series of acts 1000 also includes an act 1004 of determining client device interactions. In particular, the act 1004 involves determining, for the sample time zone, client device interactions in relation to interface features from among the set of interface features within the one or more graphical user interfaces.

Further, the series of acts 1000 includes an act 1006 of generating an updated graphical visualization from the client device interactions. In particular, the act 1006 involves, based on the client device interactions in relation to the interface features, generating, for a target time zone and utilizing the feature visualization machine learning model, an updated graphical visualization of one or more interface features from among the set of interface features. For example, the act 1006 involves utilizing the feature visualization machine learning model comprising a collaborative filter recommendation model to determine, for the updated graphical visualization of the target time zone, one or more of an arrangement of the one or more interface features or an assortment of the one or more interface features from the client device interactions associated with the sample time zone and generate the updated graphical visualization for the target time zone to reflect the one or more of the arrangement of the one or more interface features or the assortment of the one or more interface features.

In certain embodiments, the act 1006 involves utilizing the feature visualization machine learning model comprising a feature visualization neural network to extract a latent time zone vector representing the sample time zone from the client device interactions in relation to the one or more interface features associated with the sample time zone and generate the updated graphical visualization for the target time zone from the latent time zone vector. In some cases, the act 1006 involves generating the updated graphical visualization to include the one or more interface features within a single graphical user interface without requiring client device interactions to navigate across the multiple graphical user interfaces.

As further illustrated in FIG. 10, the series of acts 1000 includes an act 1008 of providing the updated graphical visualization for display. In particular, the act 1008 involves providing, for display within a graphical user interface of a client device located within a target time zone, the updated graphical visualization of the one or more interface features. For example, the act 1008 involves providing the updated graphical visualization of the one or more interface features for display within a graphical user interface of a client device within the target time zone. In some cases, the act 1008 involves providing one or more of a different arrangement or a different assortment of the set of interface features than represented within the graphical visualization for the sample time zone. In these or other cases, the act 1008 involves providing the one or more interface features within a single graphical user interface without requiring client device interactions to navigate across the multiple graphical user interfaces. For instance, the act 1008 involves providing a modified product description.

In some embodiments, the series of acts 1000 includes an act of determining a similarity score between the sample time zone and the target time zone according to historical network user behavior within the sample time zone and within the target time zone. In these or other embodiments, the series of acts 1000 includes an act of determining, according to the similarity score between the sample time zone and the target time zone, one or more of the arrangement of the one or more interface features or the assortment of the one or more interface features for the target time zone utilizing the feature visualization machine learning model.

In one or more implementations, the series of acts 1000 includes an act of compare similarity scores associated with a plurality of candidate sample time zones in relation to the target time zone. Further, the series of acts 1000 can include an act of selecting the sample time zone from among the plurality of candidate sample time zones according to the comparison. In some cases, the series of acts 1000 includes acts of determining, from the client device interactions in relation to the interface features, selection counts corresponding to the interface features and selecting the one or more interface features for the updated graphical visualization according to the selection counts.

In some cases, the series of acts 1000 includes an act of generating, for display via client devices located in an additional sample time zone, an additional graphical visualization of an additional set of interface features. Additionally, the series of acts 1000 includes an act of determining, for the additional sample time zone, client device interactions in relation to the additional set of interface features. Further, the series of acts 1000 includes an act of generating the updated graphical visualization for the target time zone according to the client device interactions in relation to the additional set of interface features.

FIG. 11 illustrates an example series of acts 1100 for generating an updated graphical visualization for an order of geographic regions utilizing a feature visualization machine learning model based on client device interactions. In particular, the series of acts 1100 includes an act 1102 of generating similarity scores for geographic regions. For example, the act 1102 involves generating, for providing an interface feature for display on client devices, similarity scores for a plurality of geographic regions based on historical network user behavior.

As shown, the series of acts 1100 also includes an act 1104 of determining an order for the geographic regions. In particular, the act 1104 involves determining an order for the plurality of geographic regions comprising an initial geographic region followed by a subsequent geographic region according to the similarity scores. For example, the act 1104 involves monitoring network user behavior within each of the plurality of geographic regions and determining, from the network user behavior and for a given geographic region from among the plurality of geographic regions, a similarity score in relation to every other geographic region within the plurality of geographic regions.

In some cases, the act 1104 involves selecting the initial geographic region from among the plurality of geographic regions, determining, for immediately following the initial geographic region within the order, the subsequent geographic region as a geographic region with a highest similarity score in relation to the initial geographic region, and determining, for immediately following the subsequent geographic region within the order, an additional subsequent geographic region as a next geographic region with a next-highest similarity score in relation to the subsequent geographic region.

Additionally, the series of acts 1100 includes an act 1106 of determining client device interactions from an initial geographic region. In particular, the act 1106 involves determining, for the initial geographic region, client device interactions in relation to an interface feature displayed in a graphical visualization on client devices located within the initial geographic region. In some embodiments, the series of acts 1100 includes an act of selecting the initial geographic region. Selecting the initial geographic can involve determining multiple candidate orders of the plurality of geographic regions, generating updated graphical visualizations of the interface feature for successive geographic regions within the multiple candidate orders, comparing performance metrics of the interface feature associated with individual candidate orders within the multiple candidate orders, and selecting the initial geographic region according to comparing the performance metrics.

Further, the series of acts 1100 includes an act 1108 of generating an updated graphical visualization for a subsequent geographic region. In particular, the act 1108 involves generating, from the client device interactions in relation to the interface feature and utilizing a feature visualization machine learning model, an updated graphical visualization of the interface feature for the subsequent geographic region. For example, the act 1108 involves generating the updated graphical visualization of the interface feature utilizing the feature visualization machine learning model to improve a performance metric comprising one or more of clicks or conversions.

As further illustrated in FIG. 11, the series of acts 1100 includes an act 1110 of providing the updated graphical visualization for display. In particular, the act 1110 involves providing, for display within a graphical user interface of a client device within the subsequent geographic region, the updated graphical visualization of the interface feature.

In some embodiments, the series of acts 1100 includes an act of determining client device interactions from the subsequent geographic region in relation to the interface feature. In addition, the series of acts 1100 includes an act of generating, for an additional subsequent geographic region that comes after the subsequent geographic region within the order for the plurality of geographic regions, an additional updated graphical visualization of the interface feature from the client device interactions from the subsequent geographic region. Further, the series of acts 1100 includes an act of providing the additional updated graphical visualization of the interface feature for display on a client device within the additional subsequent geographic region.

In some cases, the series of acts 1100 includes acts of determining a performance metric comprising one or more of a number of clicks or a number of conversions associated with the interface feature by monitoring network user behavior from the plurality of geographic regions in relation to the interface feature, selecting a new initial geographic region according to the performance metric of the interface feature, and determining, according to the similarity scores, an updated order for the plurality of geographic regions comprising the new initial geographic region followed by a new subsequent geographic region.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
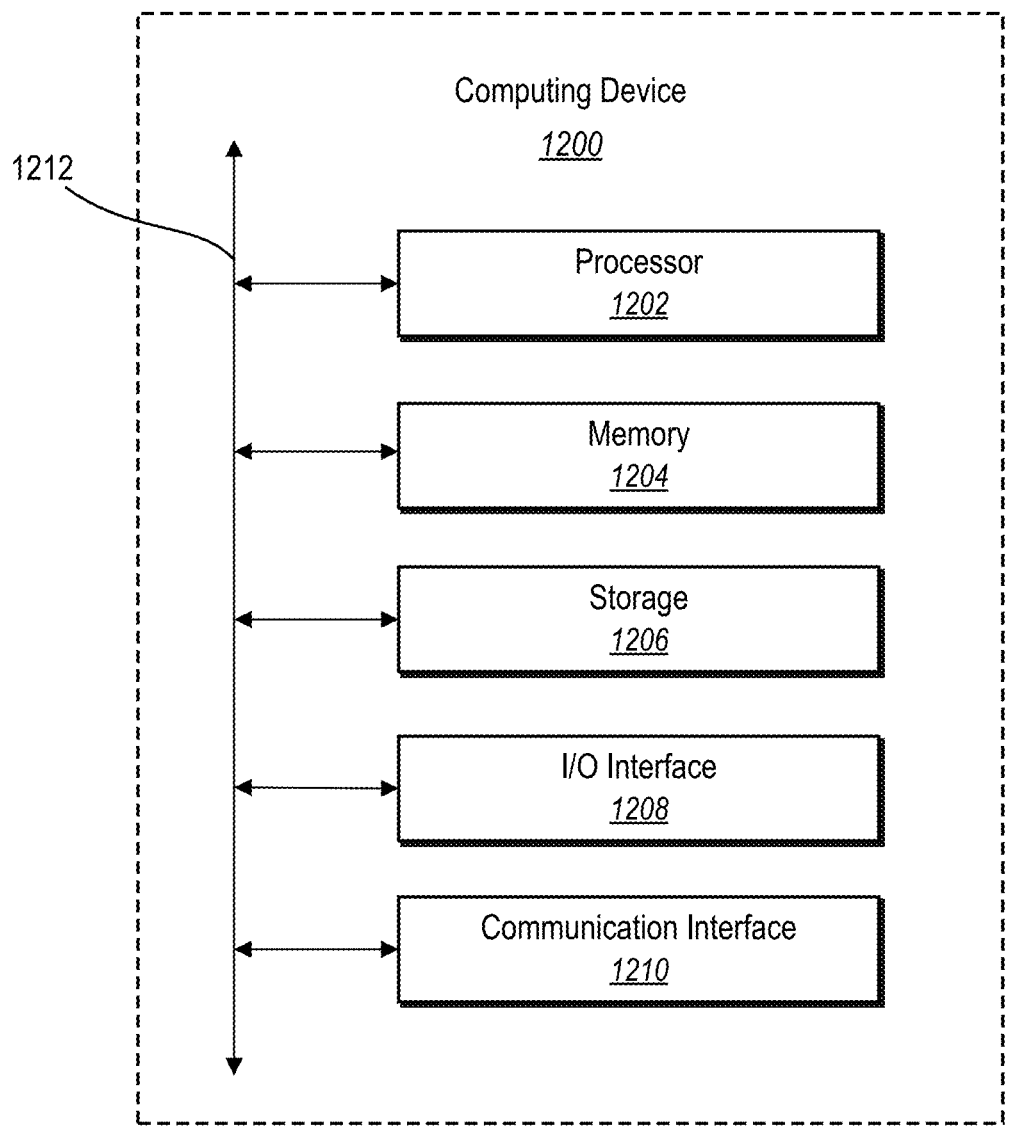
FIG. 12 illustrates a block diagram of an example computing device in accordance with one or more embodiments.

FIG. 12 illustrates, in block diagram form, an example computing device 1200 (e.g., the computing device 900, the client devices 108a-108n, and/or the server(s) 104) that may be configured to perform one or more of the processes described above. One will appreciate that the intelligent interface feature system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   one or more memory devices comprising a feature visualization machine learning model and data corresponding to a set of digital content items; and
   one or more computing devices that are configured to cause the system to:
      generate, for display within one or more graphical user interfaces of a plurality of client devices located in a sample time zone, a graphical visualization of the set of digital content items in a first arrangement;
      determine, for the sample time zone, client device interactions in relation to digital content items from among the set of digital content items in the first arrangement within the one or more graphical user interfaces;
      determine a similarity score between the sample time zone and a target time zone according to historical network user behavior within the sample time zone and within the target time zone;
      based on the client device interactions in relation to the digital content items in the first arrangement and according to the similarity score between the sample time zone and the target time zone, generate, for the target time zone and utilizing the feature visualization machine learning model, a target time zone graphical visualization of the set of digital content items in a second arrangement by relocating, removing, or rearranging one or more digital content items from among the set of digital content items by utilizing the feature visualization machine learning model to:
         generate a latent time zone vector representing client device interactions from the sample time zone;
         generate weights and biases associated with neurons of the feature visualization machine learning model according to a target performance metric; and
         generate, from the latent time zone vector utilizing the weights and biases, the target time zone graphical visualization depicting visual modifications to the set of digital content items, wherein the weights and biases of the feature visualization machine learning model are modified by:
            accessing or retrieving a ground truth graphical visualization corresponding to sample client device interactions; and
            comparing the ground truth graphical visualization with the target time zone graphical visualization; and
      provide, for display within a graphical user interface of a client device located within the target time zone, the target time zone graphical visualization of the one or more digital content items in the second arrangement.

2. The system of claim 1, wherein the one or more computing devices are further configured to cause the system to generate the target time zone graphical visualization of the one or more digital content items by utilizing the feature visualization machine learning model comprising a collaborative filter recommendation model to:
   determine, for the target time zone graphical visualization of the target time zone, one or more of an arrangement of the one or more digital content items or an assortment of the one or more digital content items from the client device interactions associated with the sample time zone; and generate the target time zone graphical visualization for the target time zone to reflect the one or more of the arrangement of the one or more digital content items or the assortment of the one or more digital content items.

3. The system of claim 1, wherein the one or more computing devices are further configured to cause the system to generate the target time zone graphical visualization of the one or more digital content items by utilizing the feature visualization machine learning model, wherein the feature visualization machine learning model is trained by:
   accessing or retrieving the ground truth graphical visualization corresponding to sample client device interactions; and
   modifying, based on comparing the ground truth graphical visualization with the target time zone graphical visualization, the weights and biases of the feature visualization machine learning model by back propagating to reduce a measure of loss.

4. The system of claim 1, wherein the one or more computing devices are further configured to cause the system to generate the target time zone graphical visualization of the one or more digital content items by utilizing the feature visualization machine learning model comprising a feature visualization neural network to:
   extract the latent time zone vector representing the sample time zone from the client device interactions in relation to the one or more digital content items associated with the sample time zone; and
   generate the target time zone graphical visualization for the target time zone from the latent time zone vector.

5. The system of claim 1, wherein the one or more computing devices are further configured to cause the system to:
   generate the graphical visualization to include the set of digital content items across multiple graphical user interfaces in response to client device interactions to navigate across the multiple graphical user interfaces; and
   generate the target time zone graphical visualization to include the one or more digital content items within a single graphical user interface without requiring client device interactions to navigate across the multiple graphical user interfaces.

6. The system of claim 1, wherein the one or more computing devices are further configured to cause the system to generate the target time zone graphical visualization of the one or more digital content items by utilizing the feature visualization machine learning model to:
   generate relationships between nodes representing interface features and client devices within the sample time zone; and
   generate, utilizing the relationships between nodes, the target time zone graphical visualization of the one or more digital content items.

7. The system of claim 1, wherein the one or more computing devices are further configured to cause the system to:
   determine, from the client device interactions in relation to the digital content items, selection counts corresponding to the digital content items; and
   select the one or more digital content items for the target time zone graphical visualization according to the selection counts.

8. The system of claim 1, wherein the one or more computing devices are further configured to cause the system to:
   generate, for display via client devices located in an additional sample time zone, an additional graphical visualization of an additional set of digital content items;
   determine, for the additional sample time zone, client device interactions in relation to the additional set of digital content items; and
   generate the target time zone graphical visualization for the target time zone according to the client device interactions in relation to the additional set of digital content items.

9. A non-transitory computer readable medium comprising instructions that, when executed by at least one processor, cause a computing device to:
   generate, for providing a digital content item for display on client devices, similarity scores for a plurality of geographic regions based on historical network user behavior;
   determine an order for the plurality of geographic regions comprising an initial geographic region followed by a subsequent geographic region according to the similarity scores;
   determine, for the initial geographic region, client device interactions in relation to a digital content item displayed in a graphical visualization in a first arrangement of a set of digital content items on client devices located within the initial geographic region;
   generate, from the client device interactions in relation to the digital content item displayed within the graphical visualization in the first arrangement and utilizing a feature visualization machine learning model, an updated graphical visualization of the digital content item in a second arrangement of the set of digital content items for the subsequent geographic region by relocating, removing, or rearranging the digital content item within the set of digital content items by utilizing the feature visualization machine learning model to:
      generate a latent time zone vector representing client device interactions from the initial geographic region;
      generate weights and biases associated with neurons of the feature visualization machine learning model according to a target performance metric; and
      generate, from the latent time zone vector utilizing the weights and biases, the updated graphical visualization depicting visual modifications to the set of digital content items, wherein the weights and biases of the feature visualization machine learning model are modified by:
         accessing or retrieving a ground truth graphical visualization corresponding to sample client device interactions; and
         comparing the ground truth graphical visualization with the updated graphical visualization; and
   provide, for display within a graphical user interface of a client device within the subsequent geographic region, the updated graphical visualization of the digital content item in the second arrangement.

10. The non-transitory computer readable medium of claim 9, further comprising instructions that, when executed by the at least one processor, cause the computing device to:
   determine client device interactions from the subsequent geographic region in relation to the digital content item;

generate, for an additional subsequent geographic region that comes after the subsequent geographic region within the order for the plurality of geographic regions, an additional updated graphical visualization of the digital content item from the client device interactions from the subsequent geographic region; and provide the additional updated graphical visualization of the digital content item for display on a client device within the additional subsequent geographic region.

11. The non-transitory computer readable medium of claim 9, further comprising instructions that, when executed by the at least one processor, cause the computing device to:
determine a performance metric comprising one or more of a number of clicks or a number of conversions associated with the digital content item by monitoring network user behavior from the plurality of geographic regions in relation to the digital content item;
select a new initial geographic region according to the performance metric of the digital content item; and
determine, according to the similarity scores, an updated order for the plurality of geographic regions comprising the new initial geographic region followed by a new subsequent geographic region.

12. The non-transitory computer readable medium of claim 9, further comprising instructions that, when executed by the at least one processor, cause the computing device to select the initial geographic region by:
determining multiple candidate orders of the plurality of geographic regions;
generating updated graphical visualizations of the digital content item for successive geographic regions within the multiple candidate orders;
comparing performance metrics of the digital content item associated with individual candidate orders within the multiple candidate orders; and
selecting the initial geographic region according to comparing the performance metrics.

13. The non-transitory computer readable medium of claim 9, further comprising instructions that, when executed by the at least one processor, cause the computing device to generate the updated graphical visualization of the digital content item utilizing the feature visualization machine learning model to improve a performance metric comprising one or more of clicks or conversions by:
generating one or more weights or biases within the feature visualization machine learning model according to the performance metric; and
generating, utilizing the one or more weights or biases, the updated graphical visualization to improve the performance metric comprising one or more of clicks or conversions.

14. The non-transitory computer readable medium of claim 9, further comprising instructions that, when executed by the at least one processor, cause the computing device to generate the similarity scores for the plurality of geographic regions by:
monitoring network user behavior within each of the plurality of geographic regions; and
determining, from the network user behavior and for a given geographic region from among the plurality of geographic regions, a similarity score in relation to every other geographic region within the plurality of geographic regions.

15. The non-transitory computer readable medium of claim 9, further comprising instructions that, when executed by the at least one processor, cause the computing device to determine the order for the plurality of geographic regions by:
selecting the initial geographic region from among the plurality of geographic regions;
determining, for immediately following the initial geographic region within the order, the subsequent geographic region as a geographic region with a highest similarity score in relation to the initial geographic region; and
determining, for immediately following the subsequent geographic region within the order, an additional subsequent geographic region as a next geographic region with a next-highest similarity score in relation to the subsequent geographic region.

16. A computer-implemented method comprising:
generating, for display within one or more graphical user interfaces of a plurality of client devices located in a sample time zone, a graphical visualization of a set of digital content items in a first arrangement;
determining, for the sample time zone, client device interactions in relation to digital content items from among the set of digital content items within the one or more graphical user interfaces;
determining a similarity score between the sample time zone and a target time zone according to historical network user behavior within the sample time zone and within the target time zone;
performing a step for generating a target time zone graphical visualization of the set of digital content items in a second arrangement by relocating, removing, or rearranging one or more digital content items from among the set of digital content items for the target time zone according to the similarity score between the sample time zone and the target time zone by utilizing a feature visualization machine learning model to:
generate a latent time zone vector representing client device interactions from the sample time zone;
generate weights and biases associated with neurons of the feature visualization machine learning model according to a target performance metric; and
generate, from the latent time zone vector utilizing the weights and biases, the target time zone graphical visualization depicting visual modifications to the set of digital content items, wherein the weights and biases of the feature visualization machine learning model are modified by:
accessing or retrieving a ground truth graphical visualization corresponding to sample client device interactions; and
comparing the ground truth graphical visualization with the target time zone graphical visualization; and
providing the target time zone graphical visualization of the one or more digital content items in the second arrangement for display within a graphical user interface of a client device within the target time zone.

17. The computer-implemented method of claim 16, wherein generating the graphical visualization of the set of digital content items comprises generating one or more of an arrangement or an assortment of the set of digital content items for the sample time zone preceding the target time zone.

18. The computer-implemented method of claim 16, wherein providing the target time zone graphical visualization for display within the graphical user interface of the client device within the target time zone comprises providing one or more of a different arrangement or a different assortment of the set of digital content items than represented within the graphical visualization for the sample time zone.

19. The computer-implemented method of claim 16, wherein:
- generating the graphical visualization comprises generating the set of digital content items for display across multiple graphical user interfaces in response to client device interactions to navigate across the multiple graphical user interfaces; and
- providing the target time zone graphical visualization comprises providing the one or more digital content items within a single graphical user interface without requiring client device interactions to navigate across the multiple graphical user interfaces.

20. The computer-implemented method of claim 16, wherein providing the target time zone graphical visualization for display within the graphical user interface of the client device within the target time zone comprises providing a modified product description.

\* \* \* \* \*